United States Patent
Zhang et al.

(10) Patent No.: US 6,479,595 B1
(45) Date of Patent: Nov. 12, 2002

(54) PLASMA TREATMENT OF POLYMER MATERIALS FOR INCREASED DYEABILITY

(75) Inventors: Dong Zhang, Knoxville, TN (US); Paul D. Spence, Greenville, SC (US); Qin Sun; Larry C. Wadsworth, both of Knoxville, TN (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 09/511,184

(22) Filed: Feb. 23, 2000

Related U.S. Application Data

(63) Continuation of application No. PCT/US99/19031, filed on Aug. 20, 1999.
(60) Provisional application No. 60/097,321, filed on Aug. 20, 1998.

(51) Int. Cl.$^7$ .................................................. D02G 3/00
(52) U.S. Cl. ....................... 525/344; 204/165; 427/535; 428/373
(58) Field of Search .......................... 204/165; 428/141, 428/143, 373, 357; 427/535; 525/344

(56) References Cited

U.S. PATENT DOCUMENTS

| | | | |
|---|---|---|---|
| 2,859,480 A | | 11/1958 | Berthold et al. |
| 4,140,607 A | * | 2/1979 | Kreiselmeier et al. ...... 204/165 |
| 4,642,247 A | * | 2/1987 | Mouri et al. ................ 428/206 |
| 4,744,860 A | | 5/1988 | Cop et al. |
| 5,152,879 A | * | 10/1992 | Thurm et al. ............... 204/165 |
| 5,286,532 A | | 2/1994 | Yoshikawa et al. |
| 5,294,482 A | | 3/1994 | Gessner |
| 5,362,330 A | | 11/1994 | Preussner et al. |
| 5,384,167 A | | 1/1995 | Nishikawa et al. |
| 5,403,453 A | | 4/1995 | Roth et al. |
| 5,414,324 A | | 5/1995 | Roth et al. |
| 5,425,832 A | | 6/1995 | Kusano et al. |
| 5,439,568 A | | 8/1995 | Uchiyama |
| 5,543,017 A | | 8/1996 | Uchiyama et al. |
| 6,059,935 A | * | 5/2000 | Spence ........................ 204/156 |

FOREIGN PATENT DOCUMENTS

JP         63-044965         2/1988

OTHER PUBLICATIONS

"Textile Coloration and Finishing," by Perkins S. Warren, Carolina Academic Press, Durham, North Carolina, 1996, pp. 73–97, 113–173 No month avail.

"Surface Modification of Polyethylene Film by Plasma Polymerization and Subsequent Chemical Derivation," by Shengmei Yan and Roger E. Merchant, Journal of Applied Polymer Science: Applied Polymer Symposium, 1994 vol. 54, pp. 77–85, No month avail.

"Mechanical and Dyeing Properties of Wool and Cotton Fabrics Treated with Low Temperature Plasma and Enzymes," Nam Sik Yoon, Yong Jin Lim, Mitsuru Tahara, and Toru Takagishi, Textile Research Journal, May 1996, vol. 66, pp. 329–336.

(List continued on next page.)

Primary Examiner—Nam Nguyen
Assistant Examiner—Wesley A. Nicolas
(74) Attorney, Agent, or Firm—Steve Mendelsohn

(57) ABSTRACT

Hydrophobic polymer materials having improved dyeability with water-based dyes are prepared by treating a hydrophobic polymer with aglow discharge plasma generated from working gases selected from $SO_2$, $O_2$, $N_2$, He, $H_2$, $CO_2$, $CF_4$, NO, $N_2O$, 2-Hydroxypropyl Methacrylate (HPMA), air or combinations thereof, in which a treated material comprises a hydrophobic inner core and a hydrophilic outer sheath having polar functional groups. A method of treating hydrophobic polymer materials using a glow discharge plasma, preferably at high pressure (e.g., about 50 Torr or greater), thereby modifying the active surface characteristics of the polymer to contain polar functional groups is also presented.

87 Claims, 16 Drawing Sheets

OTHER PUBLICATIONS

"Surface Characteristics of Wool and Poly(ethylene Terephthalate) Fabrics and Film Treated with Low–Temperature Plasma Under Atmospheric Pressure," by Tomiji Wakida, Seiji Tokino, Shouhua Niu, Haruo Kawamura, Yukihiro Sato, Muncheul Lee, Hiroshi Uchiyama, and Hideo Inagaki, Textile Research Journal, Aug. 1993, vol. 63, pp. 433–438.

"Effect of Corona Discharge on the Surface of Wool and Its Application to Printing," by Jangmi Ryu, Tomiji Wakida, and Toru Takagishi, Textile Research Journal, Oct. 1991, vol. 61, pp. 433–438.

"The Effect of Sputter Etching on the Surface Characteristics of Black–Dyed Polyamide Fabrics," by Jangmi Ryu, Jinjin Dai, Kang Koo, and Tomiji Wakida, JSDC, May/Jun. 1992, vol. 108, pp. 278–282.

"Room Temperature Sterilization of Surfaces and Fabrics with a One Atmosphere Uniform Glow Discharge Plasma," K. Kelly–Winterberg, T.C. Montie, C. Brickman, J.R. Roth, A.K. Carr, K. Sorge, L.C. Wadsworth, and P.PY. Tsai, Journal of Industrial Microbiology & Biotechnology, 1998, vol. 20, pp. 69–74, No month avail.

* cited by examiner

| SAMPLE ID | TREATMENTS | PLASMA CONDITIONS ||| COLOR STRENGTH (K/S) |
| --- | --- | --- | --- | --- | --- |
| | | WORKING GAS | POWER LEVEL (W) | TIME (sec) | |
| PP-100997-0 | CONTROL | CONTROL | 0 | 0 | 0.331 |
| PP-011097-I | PLASMA-1 | $10 N_2 + 0.25 H_2$ | 475 | 30 | 1.182 |
| PP-011097-II-1 | PLASMA-2 | $10 N_2 + 0.25 H_2 + 1.5 He$ | 375 | 30 | 1.81 |
| PP-010997 | PLASMA-3 | $10 N_2 + 4 H_2 + 2 He$ | 475 | 5 | 1.215 |
| PP-100997-5 | PLASMA-4 | $CO_2$—HPMA—$N_2$ | 345 | 1 | 2.8915 |
| PP-100897-5 | PLASMA-5 | HPMA + N | 605 | 0.8 | 2.768 |
| BICO PE/PP | PLASMA-6 | $3.5 N_2O + 1.1 O_2 + 3.1 He$ | 40 | 1.3 | 3.71 |

FIG. 9A

PLASMA TREATMENT OF POLYMER MATERIALS FOR INCREASED DYEABILITY

CROSS-REFERENCE TO RELATED APPLICATIONS

This application is a continuation of PCT application US99/19031 filed on Aug. 20, 1999, which claims the benefit of the filing date of U.S. provisional application No. 60/097,321, filed on, Aug. 20, 1999 as attorney docket no. 372.6703PROV.

FEDERALLY SPONSORED RESEARCH OR DEVELOPMENT

This application was partially funded with HATCH funds from the United States Department of Agriculture (USDA), Agency Identification Nos. CSRS and TEN, as part of Regional Project S-272 (Southern Region Research Technical Committee for the "Development of Textile Materials for Environmental Compatibility and Human Health and Safety"), under Work Unit/Project No. TEN00133.

BACKGROUND OF THE INVENTION

1. Field of the Invention

The present invention relates generally to a process for increasing the dyeability of polymer materials, and more particularly to a process for improving the dyeability of hydrophobic polymer materials with water-based dyes.

2. Description of the Related Art

The colorability, or dyeability, of polymer materials is dependent upon the chemical and physical properties of the polymers. As used herein, the term "polymer material" may refer to a single strand of polymer fiber, a web of polymer fibers, a fabric of polymer fibers, a polymer film, or any portion thereof, whether knitted, woven, or nonwoven. As used herein, the term "hydrophobic polymer material" includes any polymer material that exhibits hydrophobic characteristics.

Certain polymers are able to be readily colored, or dyed, through submersion with dyeing agents including dyes. As used herein, the term "dyes" includes acidic, basic, neutral, disperse, direct, sulfur, azoic, reactive, and vat dyes, inks, and pigments, whether natural, synthetic, water soluble, or water dispersible. A polymer's dyeability is due to the presence of either receptor groups chemically present in the molecular structure of the polymer, the predominate presence of noncrystalline regions in the polymer's molecular structure, or both. The presence and reactivity of these receptor groups and/or the presence of noncrystalline regions is often a determinate to the amount of dye, and therefore the color, which can be adsorbed and possibly absorbed by the polymer. Typically, polymers having water-soluble receptor groups (i.e., hydrophilic polymers) are typically more easily dyed than polymers devoid of such groups (i.e., hydrophobic polymers). Similarly, polymers predominately comprised of noncrystalline regions are more easily dyed than polymers exhibiting tightly packed crystalline structures.

Fibers that are chemically comprised of polar functional groups in their molecular structure are often dyeable since the polar groups serve as active receptor sites for the attraction of dye molecules. For example, it is known that cotton comprises hydroxyl groups that act as strong polar functional groups. The hydroxyl groups attract and bond with dye molecules, such that cotton fibers that are submerged in an aqueous dye solution adsorb both dye and water molecules. The adsorbed water molecules cause the cotton fibers to swell such that the dye molecules may then diffuse into the molecular structure of the cotton fiber and thereby effect a color change to the cotton material.

Fiber-forming polymers often physically exhibit crystalline and noncrystalline regions in their structure. In the crystalline regions, polymer molecules are orderly and tightly packed. In the noncrystalline regions (i.e., amorphous regions), polymer molecules are often randomly arranged which thereby enables dye molecules to penetrate the molecular structure of the polymer, along with water molecules, under certain environmental conditions.

Polypropylene (PP) and polyethylene teraphthalate (PET) spunbond (SB) nonwovens are the world's leading synthetic materials due to their inherent characteristics of strength, resistance to abrasion, resiliency, reasonably low cost, and material-forming characteristics. The popularity and integration of these fabrics into the marketplace are exemplified by the annual production volumes of PP and PET, which are estimated to exceed 50 million tons and 5 million tons, respectively. However, since both PP and PET are hydrophobic, dyeing these polymer materials with water-based dyes has proven extremely difficult.

It is known that PP molecules are comprised of highly crystalline molecular chains are devoid of polar functional groups, and are therefore hydrophobic. Any interaction of dye molecules with PP material results from Van der Waals effects which are sufficiently weak such that dye molecules are often easily washed from the material with water. Consequently, PP molecules are difficult to dye since the dye molecules may not be chemically bonded by adsorption onto the polymer material.

It is also known that PET molecules are comprised of molecular chains which have polar ester (—COOR) groups in their molecular repeat units. Due to the extreme weakness of these ester groups, PET materials, characteristically, are essentially devoid of polar functional groups and are therefore also hydrophobic. Further, PET macromolecules are predominately crystalline in structure, such that a high degree of inter-chain bonding results causing a high glass transition temperature which is further indicative of poor dyeability. Thus, PET materials are relatively chemically inert, and less penetrable to solvents and dyes.

It is known to color PP materials by adding dye pigment to the resin prior to extrusion and melt spinning of the polymer. However, use of this method requires additional coloring times for non-standard colors. This method further limits the recoloration of dyed materials since the material is already extruded with a dye pigment incorporated therein. Further, it is often cost prohibitive to have small quantities of PP material undergo this process.

It is known to dye PET materials using the Thermosol® process (registered trademark of E. I. DuPont, Wilmington, Del.) which is a pad-dry-bake process consuming high energy. It is also known to dye PET materials using phenol-based organic compounds with disperse dyes. The organic compound acts as a carrier for dye on the PET material and causes the material to swell which thereby enables non-water-soluble, disperse dyes to enter and color the material by a diffusion process. It is further known that the use of these organic compounds and the resulting waste from the manufacturing processes are both odorous and environmentally damaging. These organic compounds, and their effluents, must therefore undergo treatment at the end of the dyeing process. As a result, dyeing PET materials using phenol-based organic compounds results in higher manufacturing costs, air pollution, and the wasteful use of high volumes of water for effluent cleansing at the end of the manufacturing process.

It is also known to dye PET materials using non-water-soluble, disperse dyes above atmospheric pressure with relatively high heat. However, this process requires both special equipment (e.g., closed pressure chambers) and significant amounts of energy to reach higher pressures and temperatures, thereby adding additional costs to the process.

SUMMARY OF THE INVENTION

The present invention is directed to a plasma treatment process for modifying the surface characteristics of hydrophobic materials such that the treated materials exhibit increased dyeability with water-based dyes and the resulting modified hydrophobic polymer material having increased dyeability surface properties with water-based dye. The present invention is further directed to dyed hydrophobic polymers having been treated with the plasma process. Accordingly, the plasma treatment process and the modified material provide for efficient, cost-effective dyeability of hydrophobic polymers with water-based dyes.

According to the present invention, a hydrophobic polymer material is treated with a plasma treatment process to provide a hydrophobic polymer material having a modified surface and an improved dyeability with water-based dyes. Preferably, the plasma treatment occurs at about atmospheric pressure (e.g., about 696 Torr or other near atmosphere pressure). Typically, hydrophobic polymers and polymer materials treatable by the invention comprise PP, PET, polybutylene terephthalate (PBT), polytrimethylene terephthalate (PTT), polyethylene (PE), polyester, multicomponent combinations of the aforementioned polymers, and multicomponent combinations of the polymers with Kevlar® or Aramid® (each is a registered trademark of E. I Dupont, Wilmington, Del.) material. As used herein the term "multicomponent" refers to a composite material made of at least two different polymers extruded together. The resulting multicomponent composite material may have a core of at least one of the polymers within a sheath having at least one of the other polymers. For example, a bicomponent composite material, i.e., a particular type of multicomponent composite material comprising two different types of polymers, may have a core of one type of polymer within a sheath having another type of polymer. Alternatively, multicomponent composite materials may have two or more different types of extruded polymers that are physically side-by-side, as opposed to having a core-sheath configuration.

The present invention provides a method of treating hydrophobic polymer materials using a high-pressure glow discharge plasma treatment to modify the surfaces of the hydrophobic polymer materials to contain polar hydrophilic functional groups. As used herein, the term "high-pressure" refers to a pressure of about 50 Torr or greater. The hydrophobic polymer materials are preferably modified by a high-pressure glow discharge plasma generated in a working gas comprising $SO_2$, $O_2$, $N_2$, He, $H_2$, $CO_2$, $CF_4$, NO, $N_2O$, 2-Hydroxypropyl Methacrylate (HPMA), air, or a combination thereof.

The present invention also includes the resulting modified polymer having undergone plasma treatment such that the surface of the polymer is modified to yield improved dyeability characteristics with water-based dyes. According to the present invention, modified polymers having polarly active sites are better suited to be dyed using water-based dyes. PET and PP materials that undergo treatment by a high-pressure glow discharge plasma demonstrate significantly improved dyeability with water-based dyes due to the presence of hydrophilic functional groups on the polymer surface. Additionally, polymer material that undergo treatment by a high-pressure glow discharge plasma may further demonstrate cationic or anionic characteristics such that polarly-charged dye molecules are attracted to the oppositely-charged functional groups of the modified fiber. Optionally, the modified polymer may be dyed using dyes that are insoluble in water, such as disperse dyes.

The present invention also provides a hydrophobic polymer material having a modified surface with improved dyeability and which is dyed with a water-based dye. Preferably, the hydrophobic polymer material is PP or PET that has been treated with a high-pressure glow discharge plasma.

BRIEF DESCRIPTION OF THE DRAWINGS

Other aspects, features, and advantages of the present invention will become more fully apparent from the following detailed description, the appended claims, and the accompanying drawings in which:

FIG. 9A shows a comparison of six plasma treatments of SB PP and bicomponent webs with different working gases at different power levels and treatment times.

DETAILED DESCRIPTION

The present invention provides plasma treatment processes for introducing hydrophilic functional groups to the surface of hydrophobic polymer materials and the resulting modified hydrophobic polymer materials having increased dyeability. The present invention further provides polymer materials that have been treated by the plasma process and then dyed, using dyes including water-based dyes. Accordingly, the plasma treatment processes and the resulting modified polymer materials provide for efficient, cost-effective dyeability of hydrophobic polymers with water-based dyes.

A. Plasma Treatment Process: Modifying Surface Characteristics

Embodiments of the present invention are related to the treatment of hydrophobic polymer materials using a high-pressure glow discharge plasma to modify the polymer material surface, thereby enabling the polymers to be dyed using water-based dyes, and the resulting hydrophobic polymer materials which can be dyed using water-based dyes. U.S. Pat. No. 5,403,453, incorporated herein by reference, discloses such a high-pressure glow discharge plasma. Similarly, other plasma discharge treatment systems are known in the art and are incorporated herein such that modifications to hydrophobic polymers treated with such known systems are also incorporated herein. The present invention may be implemented using plasma discharge treatment systems operating at pressures of about 50 Torr or greater.

A high-pressure glow discharge plasma is a collection of active species such as free radicals, ions, electrons, neutral atoms, and gas molecules. When a material, such as a polymer material, is exposed to a high-pressure glow discharge plasma, the active species of the plasma are capable of penetrating a few hundred nanometers into the surface of the material and inducing chemical reactions at the surface of such material.

Figure 1:
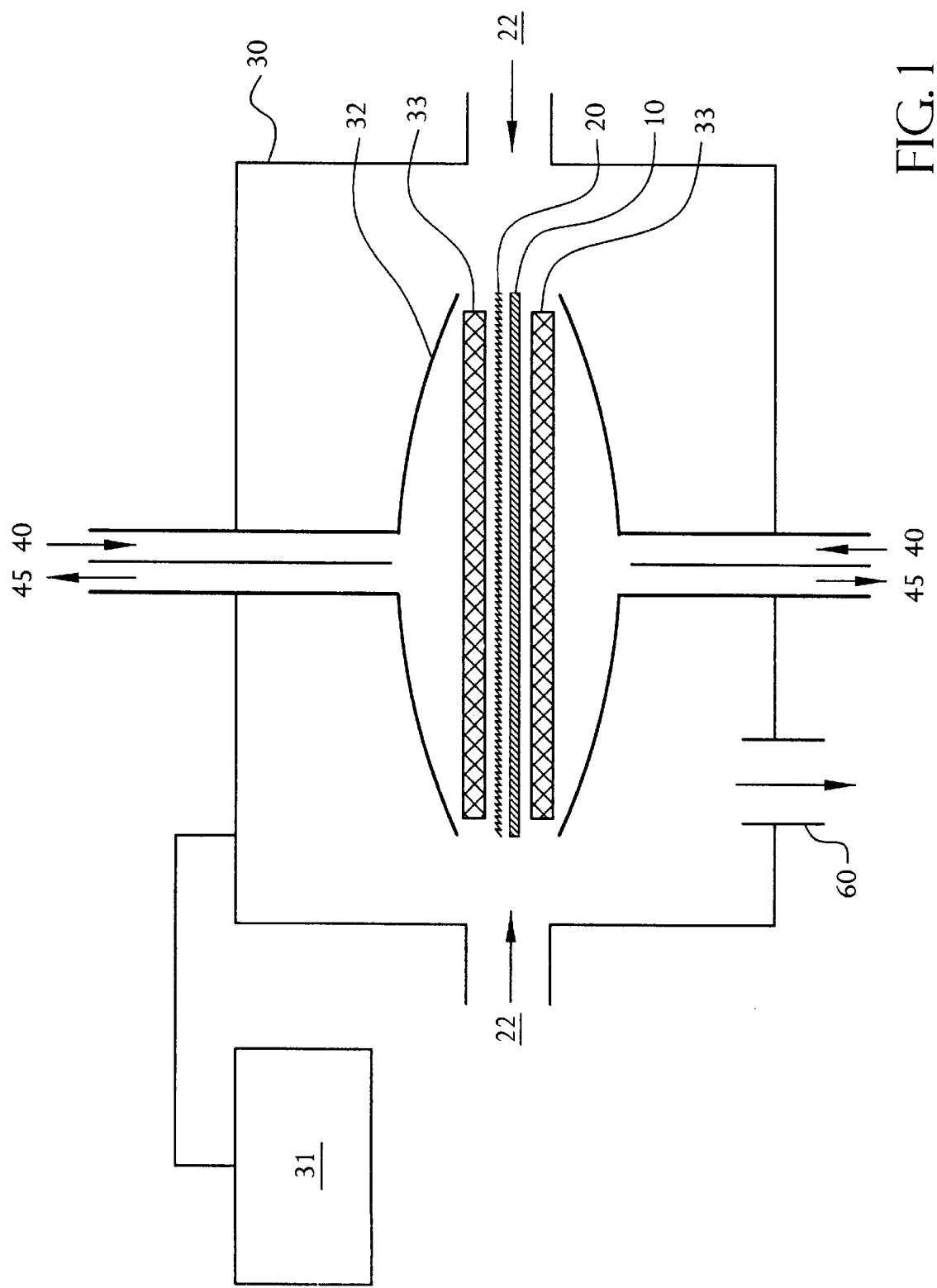
FIG. 1 illustrates a glow discharge plasma reactor used to generate a treatment plasma according to one embodiment of the invention.

FIG. 1 illustrates a glow discharge plasma reactor used to generate a treatment plasma according to one embodiment of the invention. As shown in FIG. 1, a hydrophobic polymer material 10 is provided for in the process. PET and PP are two types of hydrophobic polymer materials that are used extensively in a variety of commercial applications and which are well known in the art. The polymer material 10 is treated preferably using a high-pressure glow discharge plasma 20 in a plasma reactor 30. When treated with the plasma 20, the polymer's surface becomes modified for improved dyeability with water-based dyes due to the presence of hydrophobic functional groups.

The reactor 30 has a power supply 31 which supplies voltage to a pair of electrodes 33 located inside a bell jar 32. Working gases 22 are introduced into the bell jar 32 at each end of the jar 32 in which the working gases interact with electrons accelerated by an electric field created between the electrodes 33. The interaction of gases and electrons at about atmospheric pressure generates a glow discharge plasma 20 containing active species such as ions, free radicals, electrons, neutral atoms, and gas molecules. The energized active species penetrate the hydrophobic polymer material 10 and cause reactions on the surface of the hydrophobic polymer material 10. Cool water 40 is received for cooling the reactor and the resulting heated water 45 is then removed. Exhausted gases are removed from the reactor 30 at the exhaust port 60.

In a preferred embodiment, one of two types of hydrophobic polymer materials, PP and PET, is exposed to the plasma 20. Additionally, one of the following combinations of working gases is used to generate the plasma: ($SO_2+O_2$), ($N_2+He+H_2$), ($CO_2+O_2+He$), ($CF_4+O_2+He$), ($N_2+NO+He$), ($O_2+He$), ($CO_2+He$), ($CO_2+HPMA+N_2$), ($HPMA+N_2$), ($N_2O+O_2+He$) or ($N_2O+He$). Normally, it is sufficient to maintain a low flow rate of the working gases through reactor 30 such that the rate is sufficient to equal any leakage from the system. Typically, the working gases are introduced into the electrodes 33 with flow rates of approximately 10 to 200 liters per minute for an electrode of approximately 10 cm in diameter. However, the flow rate of the working gases will vary depending on the types of gases used, the reactor pressure, the electrode diameter, and the discharge technique employed.

It is assumed that the gas flow rates, power, treatment time, distance between electrodes, and the pressure and temperature of the reactor 30 are controllable such that each and/or all may be varied and/or maintained to improve or attempt to obtain the desired dyeability and surface modification to the polymer being treated.

Figure 2:
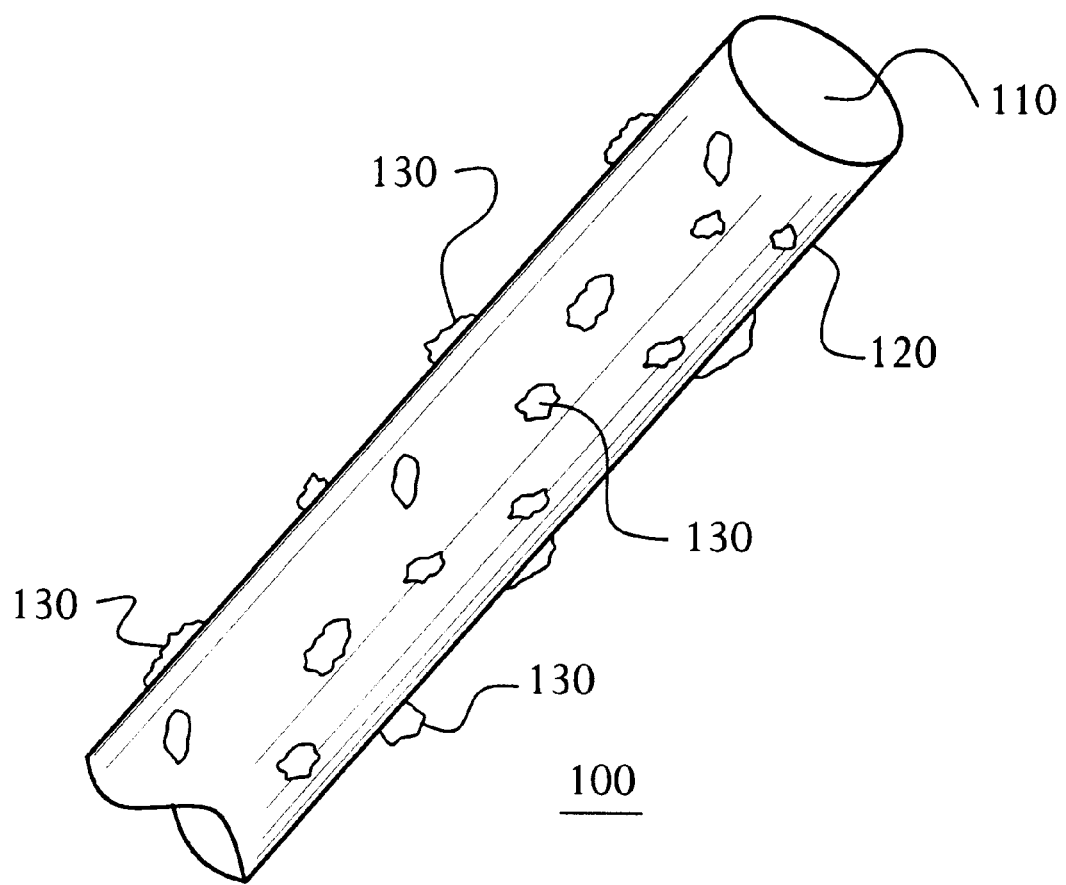
FIG. 2 illustrates a glow discharge plasma-treated polymer fiber, according to the invention.

FIG. 2 illustrates a glow discharge plasma-treated polymer fiber, according to the invention. As shown in FIG. 2, the resulting treated material 100 has a structure comprising a hydrophobic core 110 and a receptive outer sheath 120 comprising hydrophilic functional groups 130. The hydrophilic functional groups 130 are the result of the active species interacting with the surface of the polymer during plasma treatment. The presence of the hydrophilic functional groups 130 increases the dyeability of the treated material 100.

1. Embodiment I: Treating PP

In a first embodiment, a polypropylene material is treated using a high-pressure glow discharge plasma formed using ($N_2+H_2$) as working gases. The working gases have an $N_2$-to-$H_2$ flow rate ratio of between about 30 and 50. Power applied to the reactor to form the high-pressure glow discharge plasma is between about 350 watts and 450 watts. The pressure in the plasma reactor is between about 25 inches Hg and 30 inches Hg. The temperature of the reactor is between about 60° F. and 95° F. The duration of exposure of the material with the high-pressure glow discharge plasma during treatment is less than about 30 seconds, and preferably less than about 15 seconds.

In an alternative embodiment, a high-pressure glow discharge plasma treatment includes ($N_2+He+H_2$) as working gases having an $N_2$-to-$H_2$ flow rate ratio of between about 2.5 and 50 and an $N_2$-to-He flow rate ratio of between about 4 and 6.

2. Embodiment II: Treating PET

In a second embodiment, a polyethylene terephthalate material is treated using a high-pressure glow discharge plasma formed using ($N_2+H_2$) as working gases. The working gases have an $N_2$-to-$H_2$ flow rate ratio of between about 30 and 50. Power applied to form the high-pressure glow discharge plasma is between about 350 watts and 450 watts. The pressure in the plasma reactor is between about 25 inches Hg and 30 inches Hg, and the temperature is between about 60° F. and 95° F. The duration of the high-pressure glow discharge plasma treatment is less than about 30 seconds and, preferably, between less than about 15 seconds.

In an alternative embodiment, a high-pressure glow discharge plasma includes ($N_2$+He+$H_2$) as working gases having an $N_2$-to-$H_2$ flow rate ratio of between about 30 and 50 and an $N_2$-to-He flow rate ratio of between about 6 and 8, in which the plasma is formed at a power of between about 300 watts and 400 watts and at a temperature of between about 75° F. and 95° F. The duration of a high-pressure glow discharge plasma treatment is preferably less than about 30 seconds.

3. Embodiment III: Treating PET

In a third embodiment, a polyethylene terephthalate material is treated using a high-pressure glow discharge plasma formed using ($SO_2$+$O_2$) as working gases. The working gases have an $SO_2$-to-$O_2$ flow rate ratio of between about 25 and 35. Power applied to form the high-pressure glow discharge plasma is between about 300 watts and 400 watts. The pressure in the plasma reactor is between about 25 inches Hg and 30 inches Hg, and the temperature is between about 90° F. and 110° F. The duration of the high-pressure glow discharge plasma treatment is less than about 30 seconds.

B. Dying Surface-Modified Polymers

During high-pressure glow discharge plasma treatment, the hydrophobic polymer material is modified surfacially to be polarly receptive to dye molecules. The modified polymer may then be dyed in either an acidic, basic, or neutral water-based dye. The surface-modified polymer material is preferably exposed to the water-based dye at a temperature of between about 160° F. and 220° F. for a time of between about 50 minutes and 70 minutes. Examples of acidic water-based dyes include an acid blue and acid red. Examples of basic water-based dyes include a basic blue and a basic red. In preferred embodiments, PP or PET polymers are plasma treated and the resulting surface-modified PP and PET polymers are dyed. Dyes used experimentally included an acid blue dye of Caralan Navy SBLL Acid Blue 284, manufactured by Carolina Color and Chemical Company of Charlotte, N.C.; an acid red dye of NYLANTHRENE® Red B-2BSA, manufactured by and registered trademark of Crompton and Knowles Corporation of Charlotte, N.C.; and a disperse blue dye of INTRASIL® Blue BGL-N, manufactured by and registered trademark of Crompton and Knowles Corporation of Charlotte, N.C. Other dyes, colors, and combinations of dyes and colors, whether basic, acidic, or neutral, are possible.

Surface-modified PP or PET materials are preferably submersed in a dye solution applied at temperatures in step-level increments. In one procedure, polymer materials are dyed using an acid dye having a temperature of between about 165° F. and 180° F. for a time of between about 3 minutes and 8 minutes, after which the temperature is increased over a period of between about 8 minutes and 12 minutes to a temperature of between about 215° F. and 220° F. The temperature is held between about 215° F. and 220° F. for a time of between about 8 minutes and 12 minutes, and is then reduced over a period of between about 12 and 18 minutes to a temperature of between about 165° F. and 180° F. The temperature is then held at between about 165° F. and 180° F. for a time of between about 18 minutes and 22 minutes.

C. Experimental Analysis and Results

PET and PP Spunbond Nonwoven Webs

Spunbond (SB) nonwoven webs of PET (50.3 g/m$^2$) and PP (18 g/m$^2$) were continuously treated in a high-pressure plasma reactor designed for use at a pressure in the range between about 50 Torr and about 800 Torr. In particular, working gases ($SO_2$+$O_2$) and ($N_2$+He+$H_2$) were utilized in separate systems under pressures of 696 Torr. The applied power, treatment time, temperature, pressures, working gas ratios, and flow rates of the working gases were varied according to the design of the experiment. A control sample was prepared for each type of material, PET and PP, in which the control material did not undergo treatment with the plasma.

Plasma treatment conditions were conducted under the following conditions for certain samples:

| ($SO_2$ + $O_2$) plasma for PET webs: | |
|---|---|
| Working gases: | 3*$SO_2$ + 0.1*$O_2$, |
| Power lever: | P = 400/75 (325 W), |
| Chamber Temperature: | T = 102° F. |
| Chamber Pressure: | p = 696 Torr |

| ($N_2$ + $H_2$ + He) plasma for PET webs: | |
|---|---|
| Working gases: | 10*$N_2$ + 1.5*He + 0.25*$H_2$ |
| Power level: | P = 350/50 (300 W) |
| Chamber temperature: | T = 85° F., |
| Chamber pressure: | p = 696 Torr |

| ($N_2$ + $H_2$ + He) plasma for PP webs: | |
|---|---|
| Working gases: | 10*$N_2$ + 1.5*He + 0.25*$H_2$ |
| Power level: | P = 400/25 (375 W) |
| Chamber temperature: | T = 91° F., |
| Chamber pressure: | p = 696 Torr |

| ($N_2$ + $H_2$ + He) plasma for PP webs: | |
|---|---|
| Working gases: | 10*$N_{2 + 0.25 \cdot H2}$ |
| Power level: | P = 500/25 (475 W) |
| Chamber temperature: | T = 68° F., |
| Chamber pressure: | p = 696 Torr |

Following plasma treatment, the experimental and control samples were dyed using one of the previously identified dyes, the samples were cut into different shapes, each sample having a total weight of 6.4 grams, and were then wet-out in a 0.1% Triton X-100™ (trademark of Rohm & Haas, Philadelphia, Pa.) solution.

1. Disperse Dyes

For the non-water-soluble disperse dye, the dye bath was filled with 66 ml distilled water, 12 ml Triton X-100™ solution (5%), and 12 ml of carrier solution (50 g/l) being a phenol-based, water-soluble organic solution. The temperature of the dye bath was raised from room temperature of approximately 70° F. to 100° F. over about a 15-minute period, and then wet-out samples were added. After approximately 15 minutes, 40 ml of pre-dispersed dye solution (2 g/l) was added, and the temperature was raised to 210° F. over a period of about 45 minutes. The dye bath was held at 210° F. for about 45 minutes, then cooled down to 160° F.

over a period of about 60 minutes. The dye bath was held at 160° F. for 30 minutes and was then cooled down to about 150° F. over a period of approximately 5 minutes by mixing tap water at a temperature of approximately 70° F. with the dye bath. The samples remained in the dye bath for approximately 2 minutes. The samples were then removed from the dye bath and rinsed in water at a temperature of about 100° F. over a period of about 2 minutes. The rinsed samples were then further washed for approximately 2 minutes in a water bath containing a 2% Detergent FL-70® (manufactured by and registered trademark of the Fischer Scientific Company of Fair Lawn, N.J.) in which the bath was at a temperature of approximately 110° F. The samples were further rinsed in water at a temperature of about 100° F. for a period of about 2 to 5 minutes. The rinsed samples were then air dried in a conditioning room having a temperature of approximately 70° F. and a relative humidity of about 65% for a period of about 48 hours. The washing and rinsing procedures were conducted to remove unfixed dye molecules from the samples. The entire procedure was then repeated with other experimental and control samples, except that the 12 ml of carrier solution was replaced with 12 ml of distilled water.

2. Acidic Dyes

For the acid dyes, the wet-out samples were entered into a dye bath which contained 90 ml distilled water, 50 ml acetic acid solution (10.8%), and 60 ml of ammonium acetate solution (10%) at a temperature 100° F. After 15 minutes, 100 ml of pre-dissolved acid dye (2 g/l) was added and the dye bath temperature was raised to 210° F. over a period of 45 minutes. The dye bath was cooled to 160° F. over a period of about 60 minutes. Then, the samples were removed from the dye bath and washed to remove excess dye.

3. Measuring Dyeability by Color Strength Ratio (CSR)

The resulting dyed PET and PP nonwoven webs were folded into eight and sixteen layers, respectively. A Color Strength Ratio (CSR) measure was then determined from the dyed PET and PP nonwoven webs according to the dimensionless ratio K/S of the Kübelka-Munk equation:

$$K/S = (1-R)^2/2R$$

in which K is the coefficient of absorption, R is the measured reflectance, and S is the coefficient of scatter. The ratio of K/S is analogous to absorbance as measured in transparent substrates in accordance with Beer's Law. Results of K/S measurements for six plasmas under different conditions are presented in FIGS. 9A and 9B.

D. Experimental Results Summary

1. PET in Acid Dye

Figure 3A:
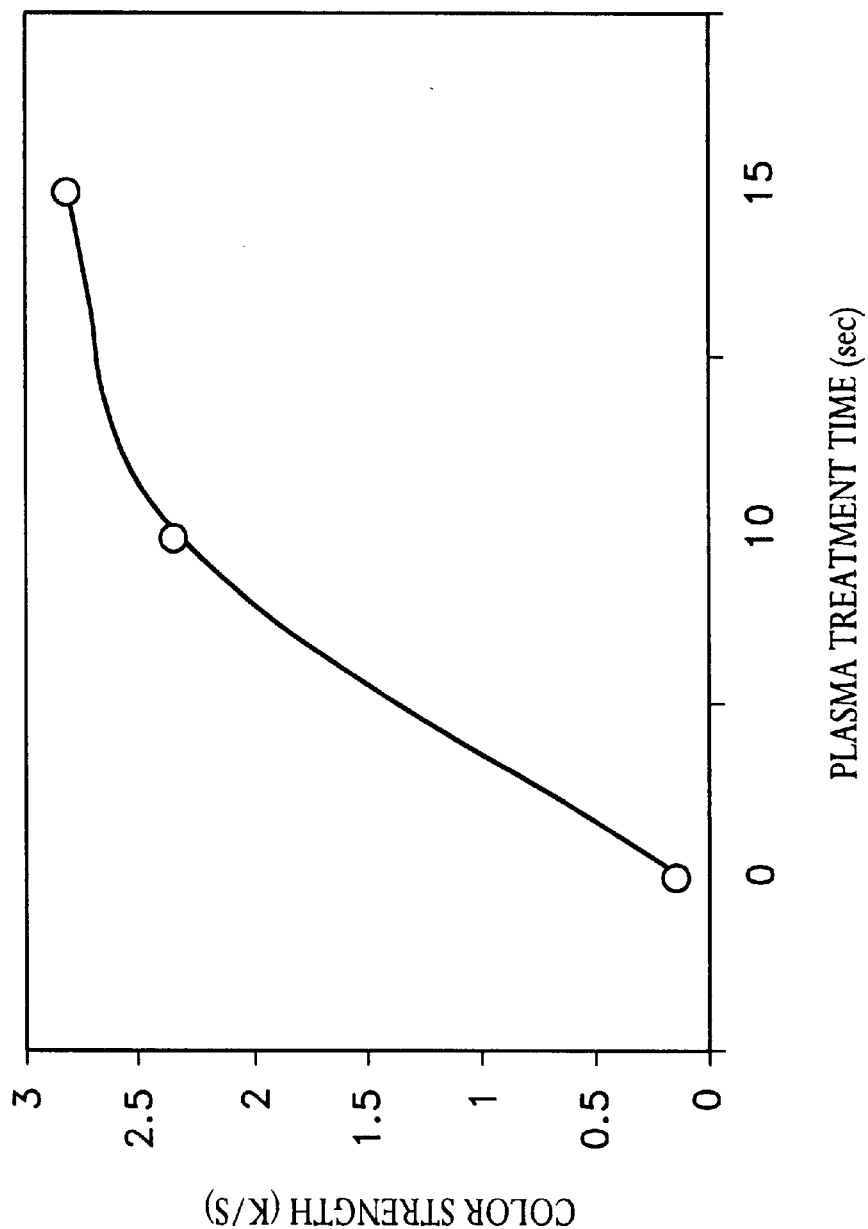
FIG. 3A shows the experimental values relating the Color Strength Ratio (CSR) to the plasma treatment time with ($SO_2+O_2$) working gases for a high-pressure glow discharge plasma treatment of PET samples according to the present invention.
Figure 3B:
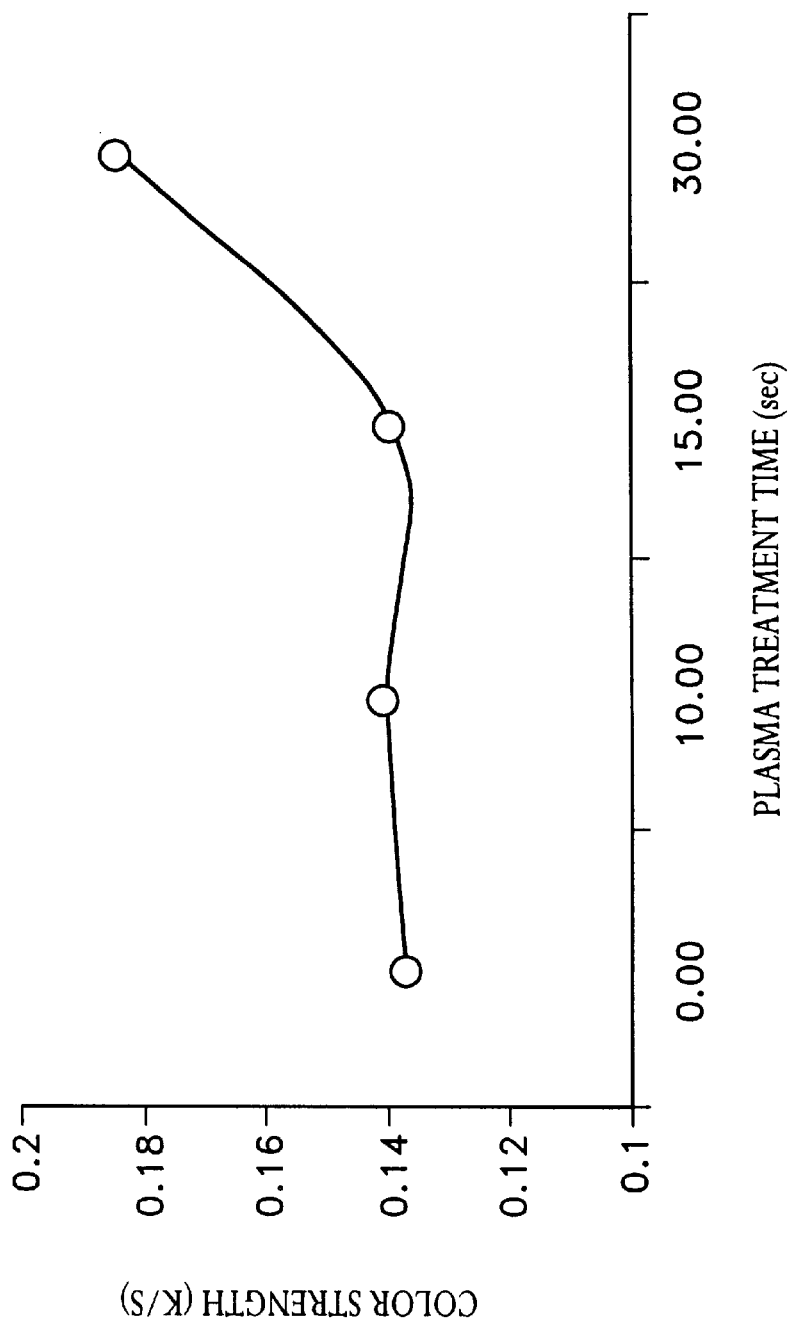
FIG. 3B shows the experimental values relating the CSR to the plasma treatment time with ($N_2+H_2+He$) working gases for a high-pressure glow discharge plasma treatment of PET samples, according to the present invention.

FIG. 3A shows the experimental values relating the Color Strength Ratio (CSR) to the plasma treatment time with $(SO_2+O_2)$ working gases for a high-pressure glow discharge plasma treatment of PET samples according to the present invention. FIG. 3B shows the experimental values relating the CSR to the plasma treatment time with $(N_2+H_2+He)$ working gases for a high-pressure glow discharge plasma treatment of PET samples, according to the present invention.

As indicated in FIGS. 3A and 3B, the plasma-treated PET samples, which were then dyed in acid dye, demonstrate a significant increase in the CSR (defined as the K/S ratio) for the acid dye samples compared to the control sample for both. working gases of $(SO_2+O_2)$ and $(N_2+He+H_2)$. The significant increase in dyeability of the spunbond PET web treated with a plasma using $(SO_2+O_2)$ as working gases was particularly significant. This phenomenon appears to be due to the increased presence of active polar groups on the material surface in which it is believed that some of the polar groups may attract oppositely-charged dye molecules.

The significant increase in the CSR indicates that the plasma treatment caused a change to the PET web structure, which may likely have affected chemical and physical properties of the polymer. The data in FIGS. 3A and 3B suggests that polar functional groups were, introduced onto the surface of the PET materials.

The types of functional groups formed on a polymer surface are partially determined by the working gases. It is believed that amino groups and other nitrogen-containing functional groups were introduced onto the PET material surfaces when the $(N_2+H_2+He)$ working gases were utilized. Similarly, it is believed that oxygen/oxygen-sulfur-containing polar functional groups were introduced on the PET material surfaces when $(SO_2+O_2)$ working gases were employed. As these functional groups are hydrophilic, the presence of the functional groups on the polymer surface permits improved dye absorption in less time.

Figure 4:
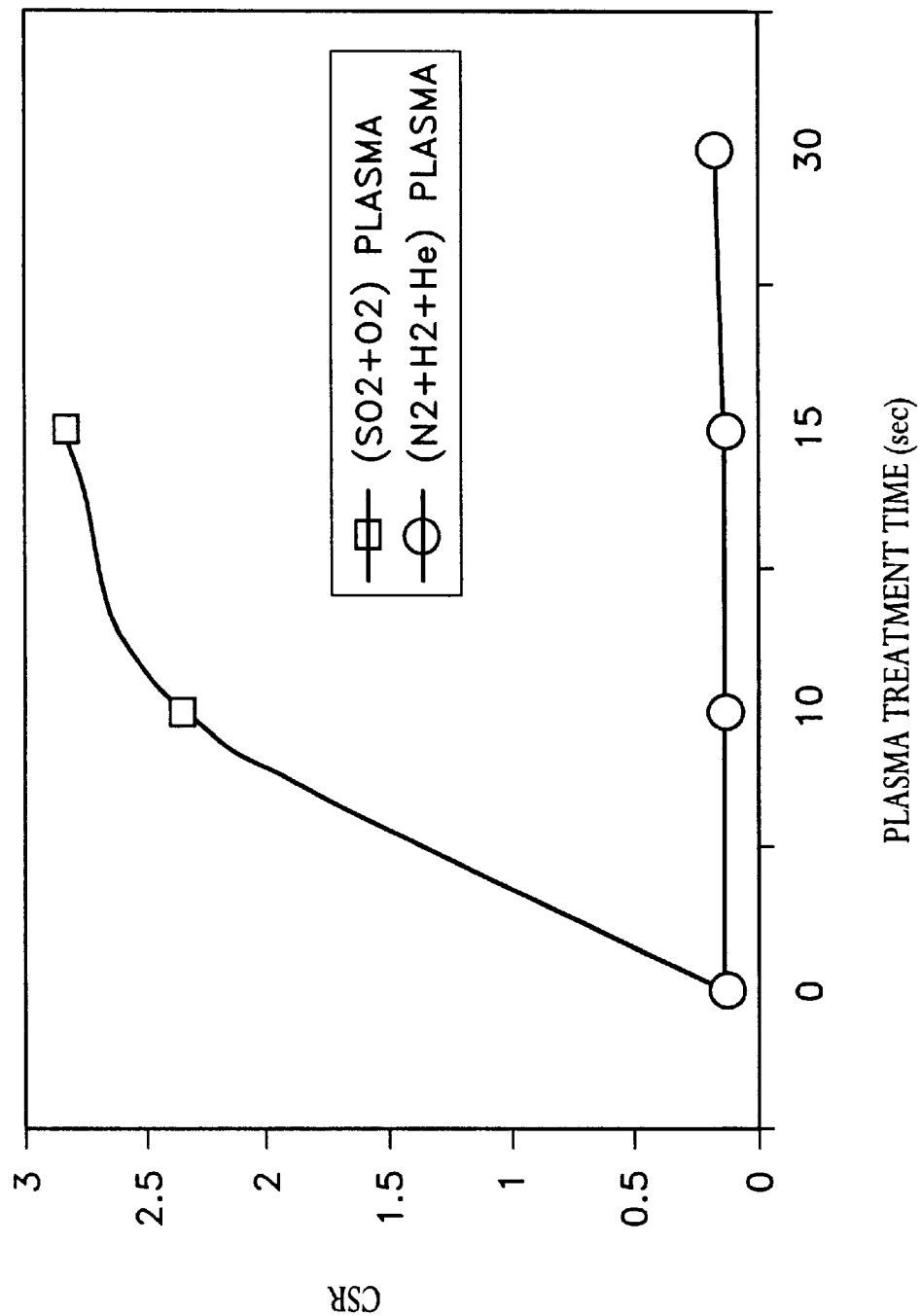
FIG. 4 shows the experimental values from FIGS. 3A and 3B plotted on the same graph.

FIG. 4 shows the experimental values from FIGS. 3A and 3B plotted on the same graph. As is suggested by FIG. 4, the density of functional groups present increases with plasma treatment time for both combinations of working gases. Longer treatment time implies higher functional group density which provides more active sites on the material surface which can improve dye take-up.

Figure 5:
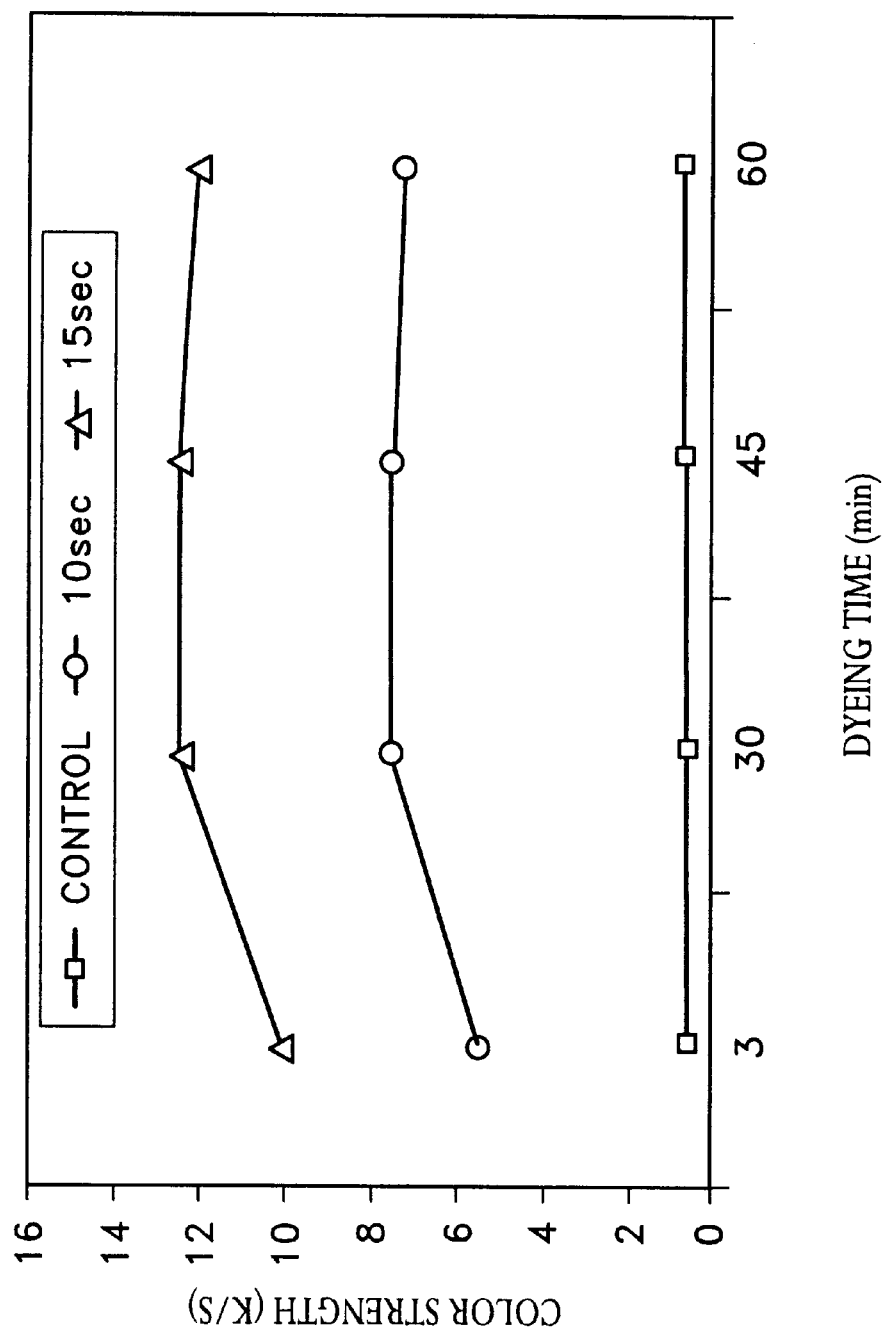
FIG. 5 shows the experimental values relating the CSR to the dyeing time used for dyeing PET samples, according to the present invention for different plasma treatment times.

FIG. 5 shows the experimental values relating the CSR to the dyeing time used for dyeing PET samples, according to the present invention for different plasma treatment times. FIG. 5 suggests that an optimum CSR for SB PET is achieved with a dyeing time, of between approximately 30 and 45 minutes, and that improved CSR colorations are achievable with slight increases in treatment times of the material with the plasma.

Figure 6:
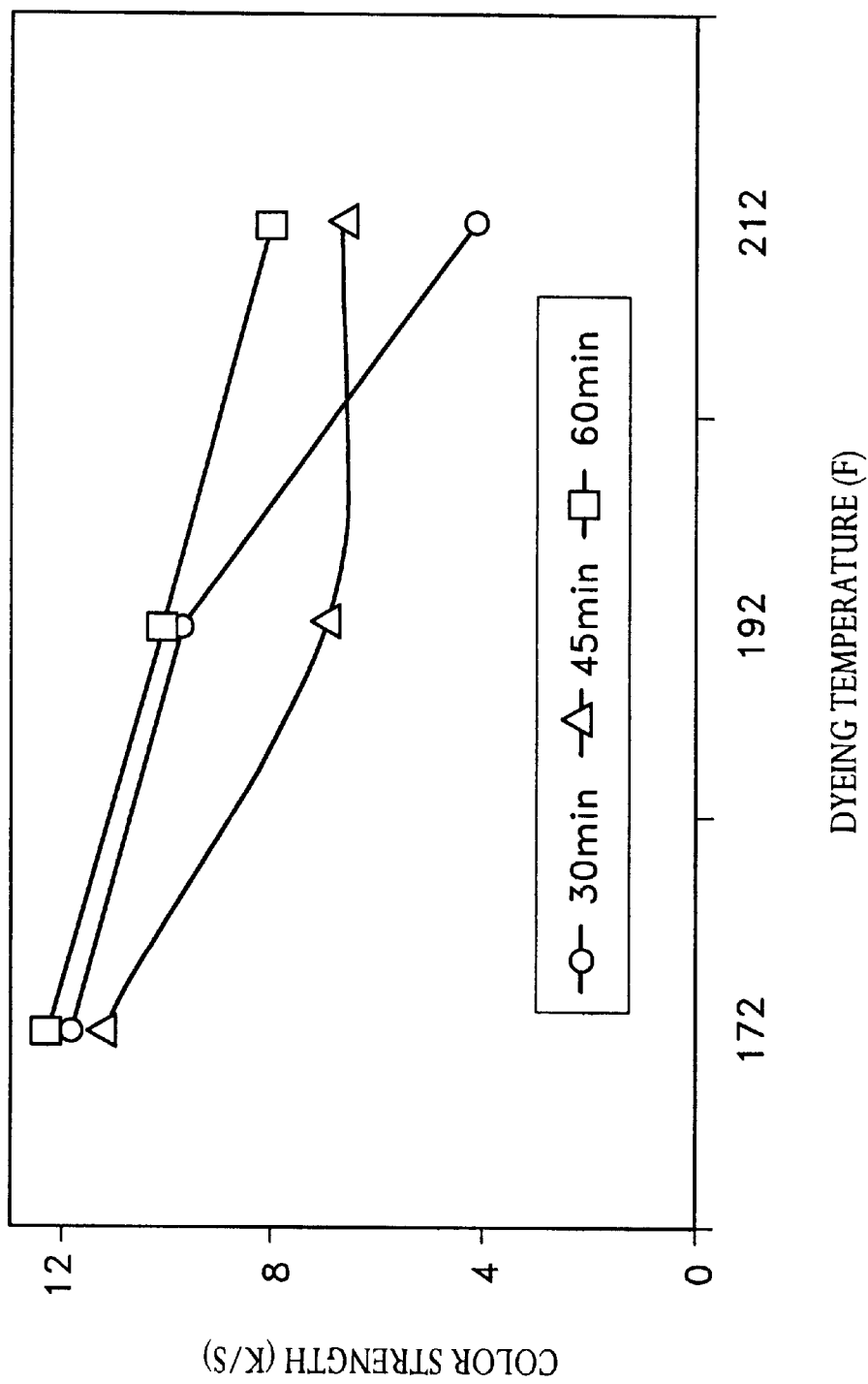
FIG. 6 shows the experimental values relating the CSR to the dyeing temperature used for dyeing PET samples according to the present invention for different dyeing times.

FIG. 6 shows the experimental values relating the CSR to the dyeing temperature used for dyeing PET samples according to the present invention for different dyeing times. FIG. 6 suggests that the CSR for SB PET treated with an $(SO_2+O_2)$ plasma and then dyed with an acid blue dye for dyeing periods ranging from about 30 minutes to 60 minutes, is higher at the lower dyeing temperatures in the range of about 172° F. to 212° F.

Figure 7:
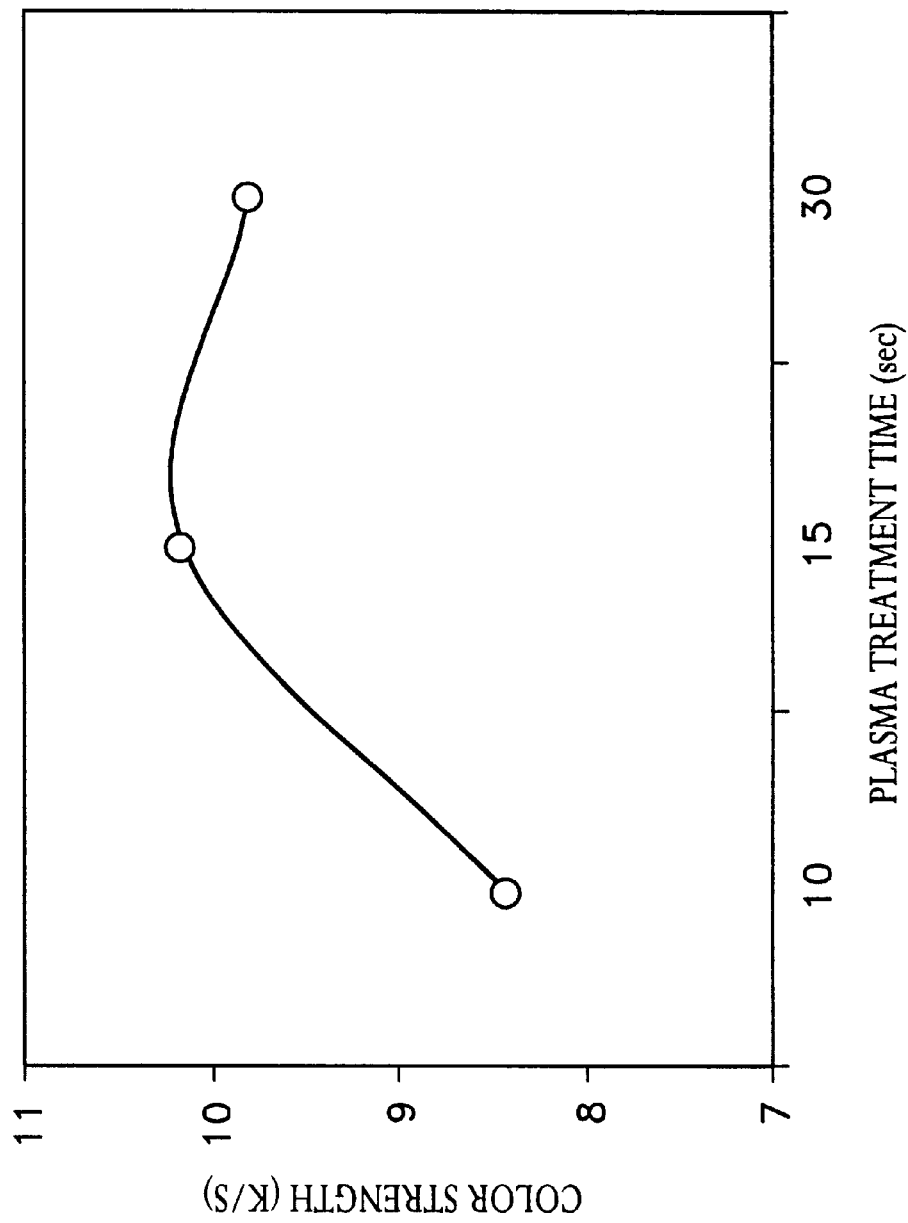
FIG. 7 shows the experimental values relating the CSR to the plasma treatment time for dyeing PET with disperse blue acid dye using a working gas of ($SO_2+O_2$).

FIG. 7 shows the experimental values relating the CSR to the plasma treatment time for dyeing PET with disperse blue acid dye using a working gas of $(SO_2+O_2)$. FIG. 7 suggests that the CSR for the SB PET samples treated with $(SO_2+O_2)$ plasma and dyed with disperse blue dye increases until a near equilibrium is achieved in the range of about 15–20 seconds. Further treatment of SB PET beyond a time of 20 seconds results in decreased CSR and hence decreased dyeability of the polymer.

Figure 8:
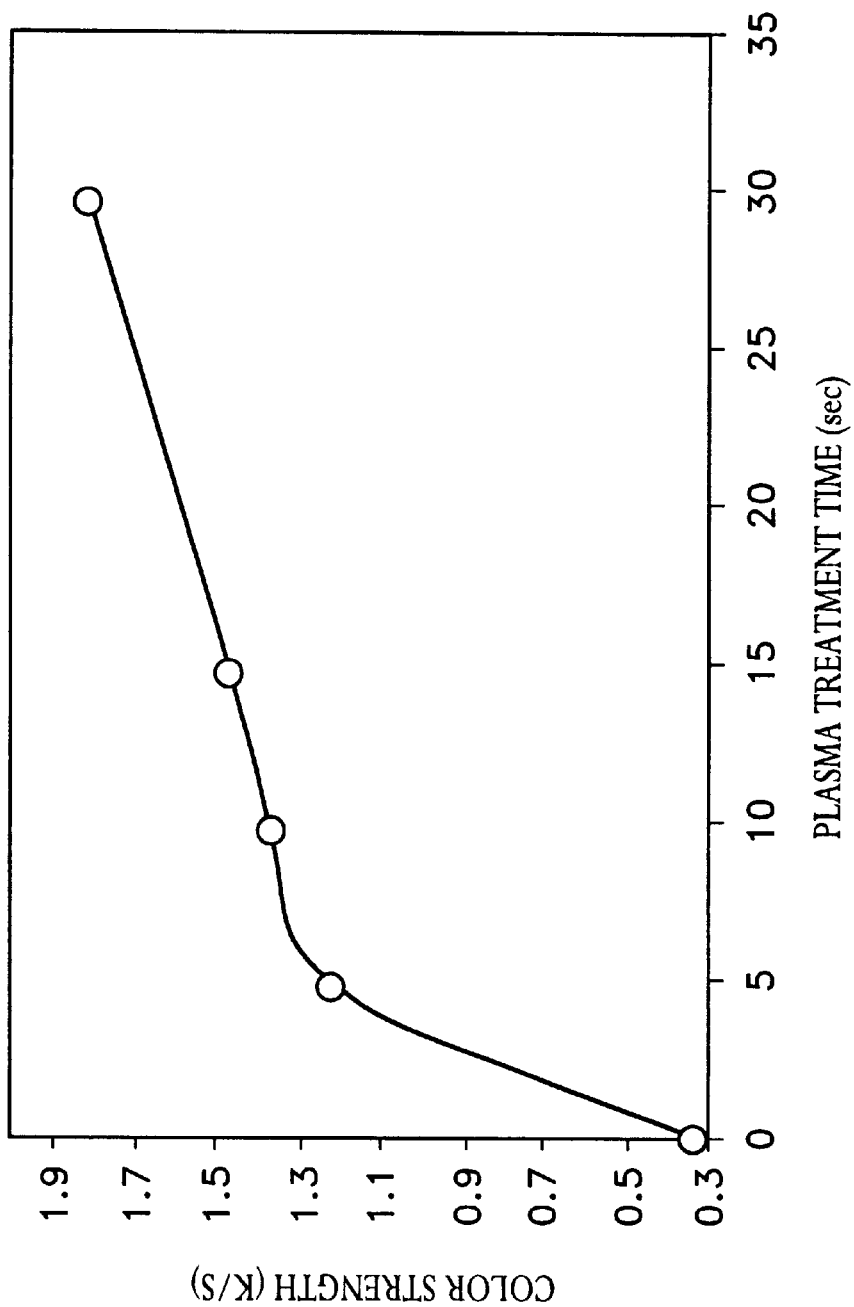
FIG. 8 shows the experimental values relating the CSR to the plasma treatment time for dyeing PP webs with acid blue using a working gas of ($N_2+H_2+He$).

FIG. 8 shows the experimental values relating the CSR to the plasma treatment time for dyeing PP webs with acid blue using a working gas of $(N_2+H, +He)$. FIG. 8 suggests that the SB PP samples treated with $(N_2+He+H_2)$ plasma showed a significant increase in CSR, when dyed with the acid blue dye. From this data, it appears that an increased dyeability was achieved with PP samples treated with $(N_2+He+H_2)$ plasma. It is believed that nitrogen-containing functional groups were introduced onto the surface of PP materials when treated with ($N_2$+He+$H_2$) plasma. Under the given plasma conditions, a time of 10 seconds was long enough to achieve good dyeability. As the plasma treatment time increased beyond 10 seconds, the dyeability continued to increase, but at a rate less dramatic than the first 5 seconds.

Figure 9B:
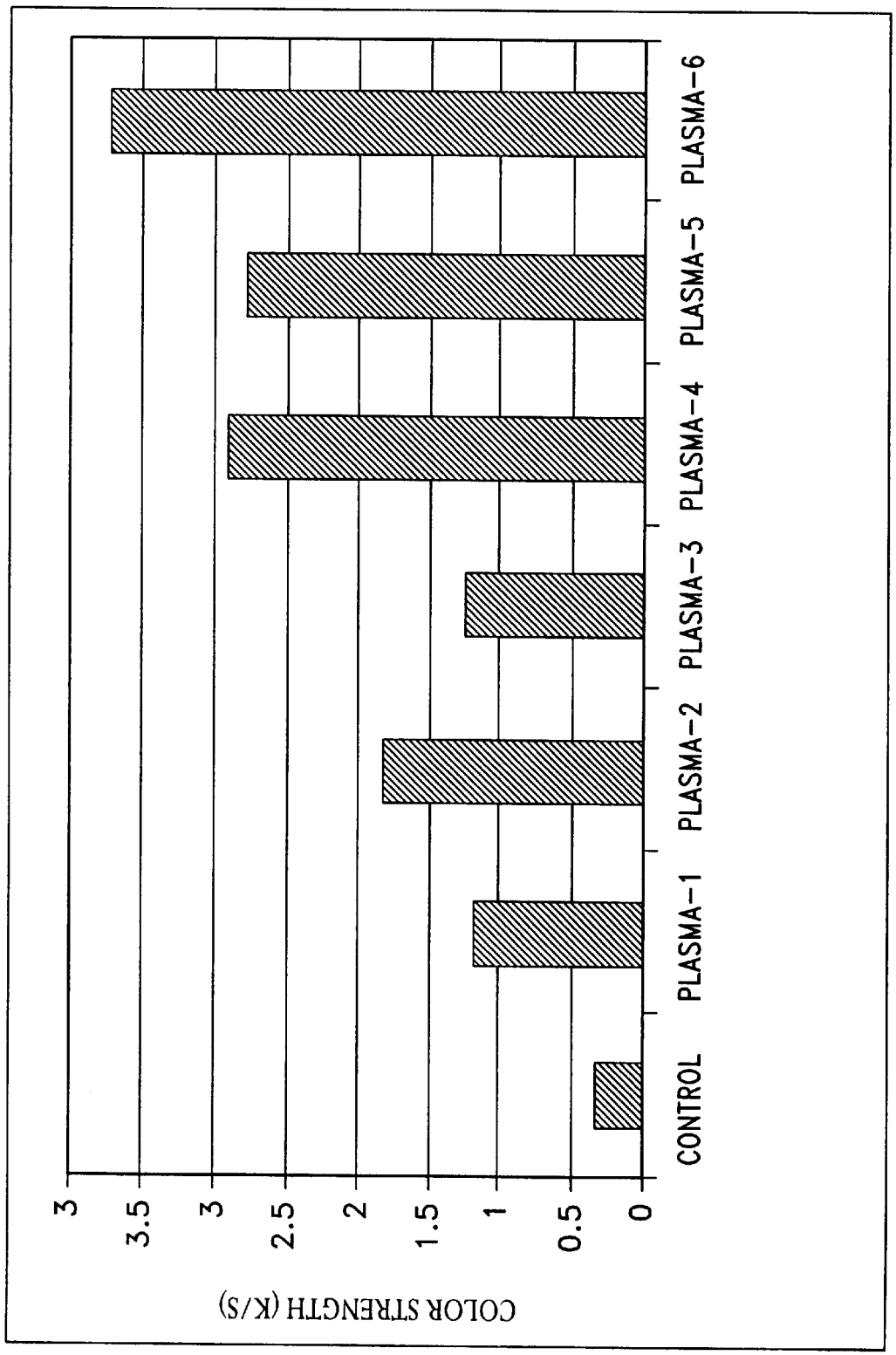
FIG. 9B is a graphical representation of the CSR for each of the samples of FIG. 9A.

FIG. 9A shows a comparison of six plasma treatments of SB PP and bicomponent webs with different working gases at different power levels and treatment times. FIG. 9A indicates the increased dyeability of SB PP and SB PE/PP bicomponents (e.g., PE-sheath/PP-core) for different plasma treatments. FIG. 9B is a graphical representation of the CSR for each of the samples of FIG. 9A.

The prior art teaches that increased crystallinity reduces the dyeability of polymer materials. It is known that plasma treatment tends to increase the crystallinity of the surface of a polymer material. As such, the prior art suggests that the dyeability of polymer materials would be decreased by plasma treatment. However, in contradistinction to the prior art, the inventors have found that the existence of plasma-induced functional groups and not the degree of crystallinity may be the more critical agent in affecting dyeability. As a result, exposing polymer material to a plasma may increase rather than decrease the dyeability of the material.

Figure 10:
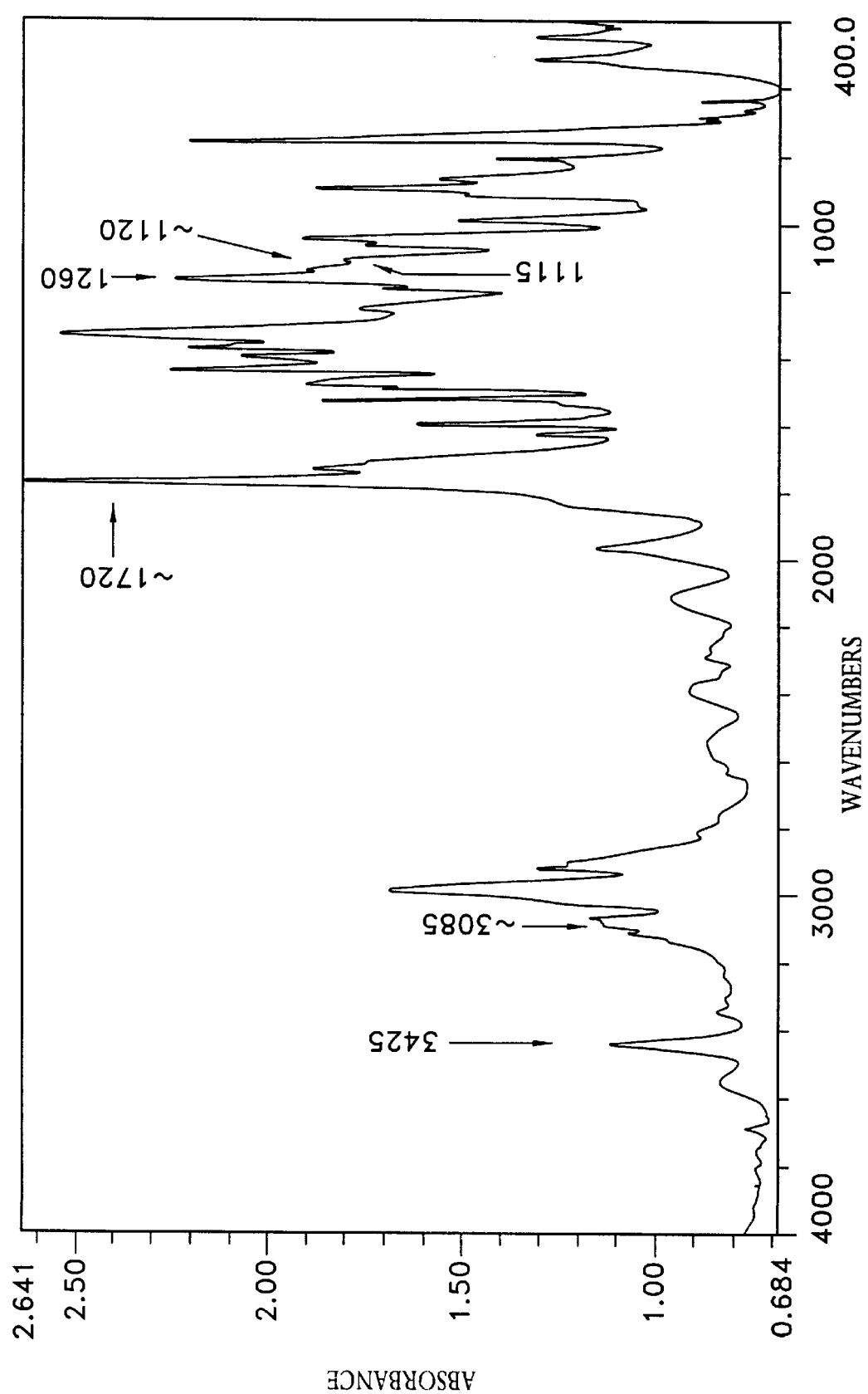
FIG. 10 shows the photoacoustic infrared (PA-IR) spectrum for a control sample of PET which has not been treated with plasma.
Figure 11:
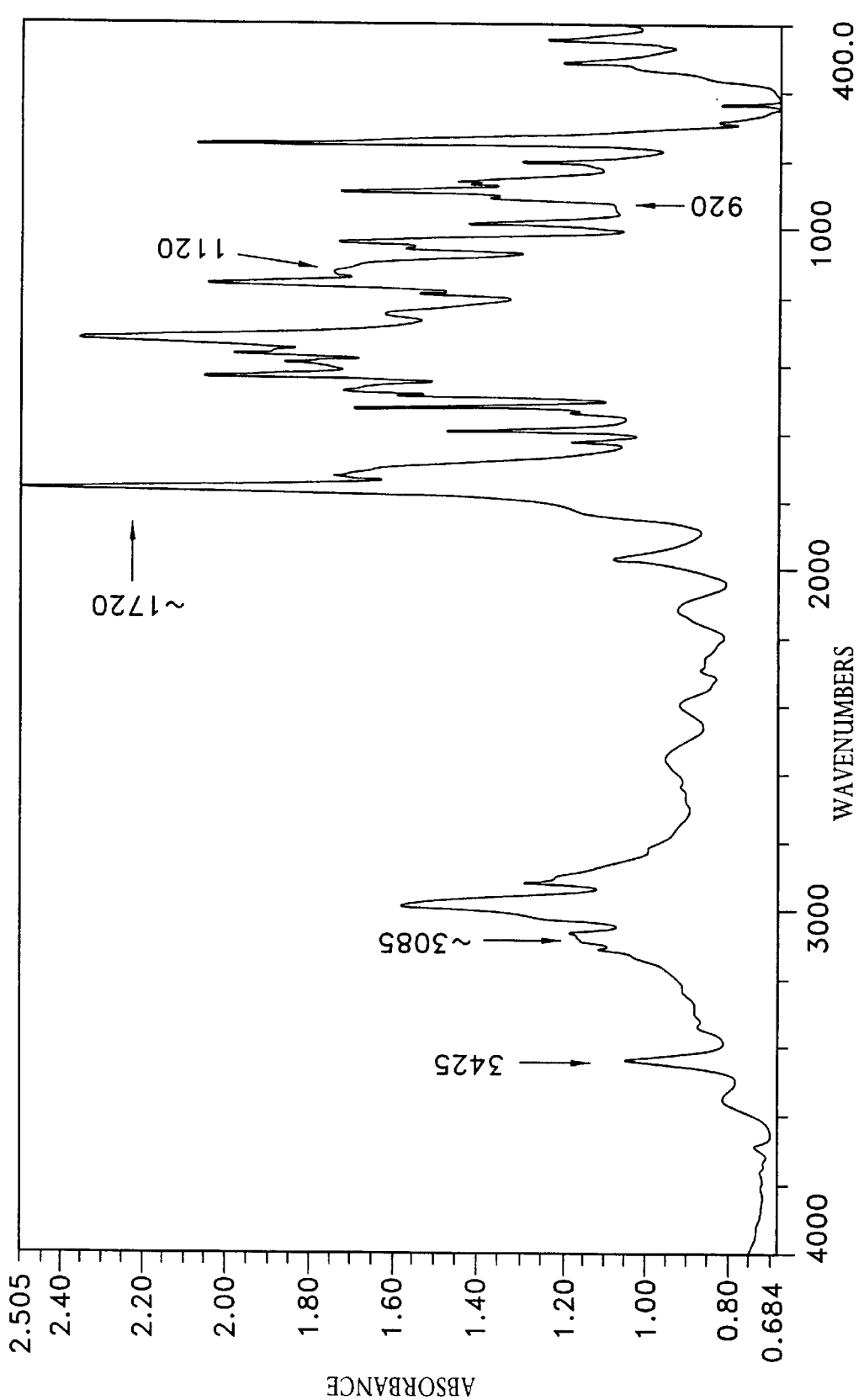
FIG. 11 shows the PA-IR spectrum for a PET sample treated with an ($SO_2+O_2$) plasma for 10 seconds.
Figure 12:
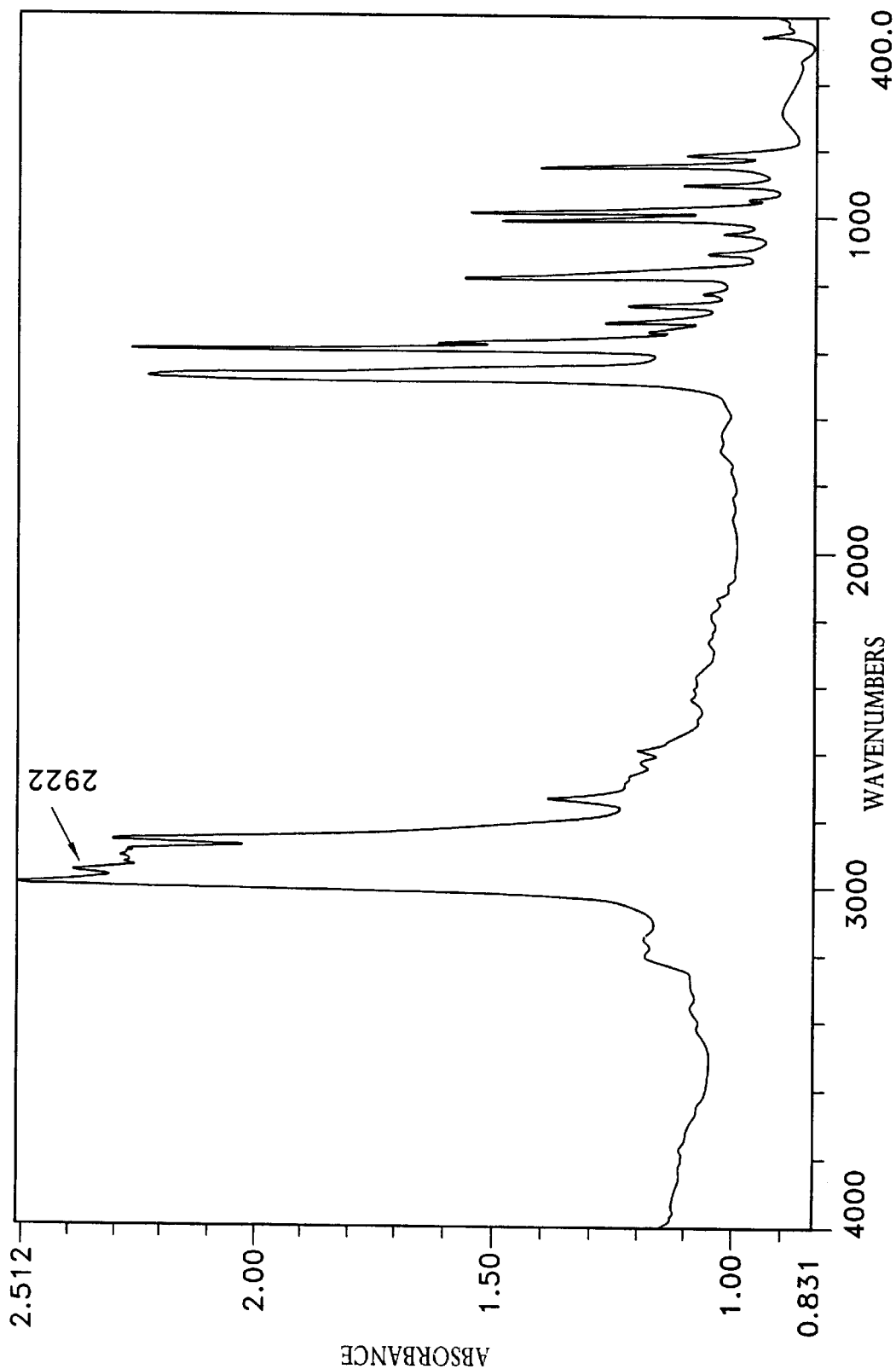
FIG. 12 shows the PA-IR spectrum for a control sample of PP which has not been treated with plasma.
Figure 13:
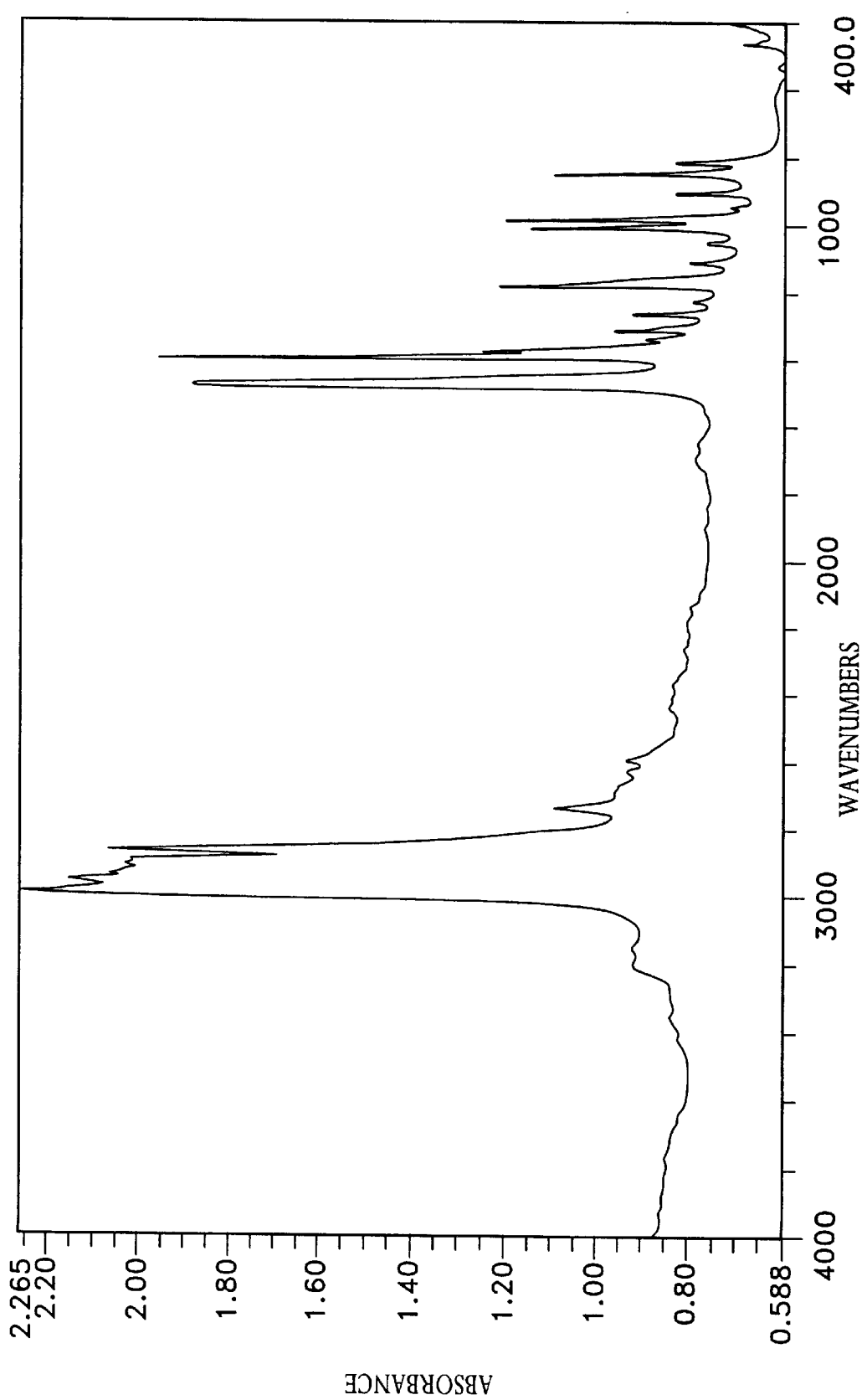
FIG. 13 shows the PA-IR spectrum for a PP sample treated with ($N_2+H_2+He$) plasma for 30 seconds.

In order to detect the surface chemical variation after plasma treatment, Fourier transition infrared (FTIR) spectroscopy was performed on PET samples treated with an ($SO_2$+$O_2$) plasma and PP samples treated with an ($N_2$+He+$H_2$) plasma. The photoacoustic infrared (PA-IR) spectrums for the PET materials treated with the ($SO_2$+$O_2$) plasma indicate composition changes on the material surface, and show that longer plasma treatment time results in greater changes. However, the PA-IR spectrums for the PP samples treated with the ($N_2$+He+$H_2$) plasma did not indicate chemical change on the material surface, although the dyeability testing indicates that surface changes occurred. FIG. 10 shows the photoacoustic infrared (PA-IR) spectrum for a control sample of PET which has not been treated with plasma. FIG. 11 shows the PA-IR spectrum for a PET sample treated with an ($SO_2$+$O_2$) plasma for 10 seconds. FIG. 12 shows the PA-IR spectrum for a control sample of PP which has not been treated with plasma. FIG. 13 shows the PA-IR spectrum for a PP sample treated with an ($N_2$+$H_2$+He) plasma for 30 seconds.

In FIGS. 10 and 11, the sharp band at approximately 3425 $cm^{-1}$ is due to the stretching mode of free hydroxyls. Its relative intensity decreased with treatment time, which indicates that the amount of hydroxyls was increased on the material surface and hydrogen bonds were developed among these groups. The stretching of hydrogen-bonded hydroxyl is associated with bands in the range of about 3200–3400 $cm^{-1}$, whose intensity increment supports the existence of increased hydrogen-bonded hydroxyls on the material surface.

The bands at approximately 1260 $cm^{-1}$ and approximately 1120 $cm^{-1}$ in FIGS. 10 and 11 are due to stretching of carbon-oxygen bonds in the aromatic ester groups. The bands at approximately 1115 $cm^{-1}$ in FIGS. 10 and 11 are associated with the stretching vibration of the sulfur-oxygen double bonds. It is believed that sulfur-oxygen double bonds overlap with other bands in this region. Similarly, the band at approximately 920 $cm^{-1}$ is an overlapped peak which is partially due to the stretching of the sulfur-oxygen double bond.

Also from FIGS. 10 and 11, the free hydroxyl band intensity at about 3425 $cm^{-1}$ and the S—O band intensity at about 920 $cm^{-1}$ were normalized against the band intensity at about 3085 $cm^{-1}$, which is associated with the carbon-hydrogen stretching for the aromatic rings. The intensity of the band at about 920 $cm^{-1}$ increased with plasma treatment time. The results indicate that sulfur-oxygen-containing functional groups were introduced on the material surfaces.

Figure 14:
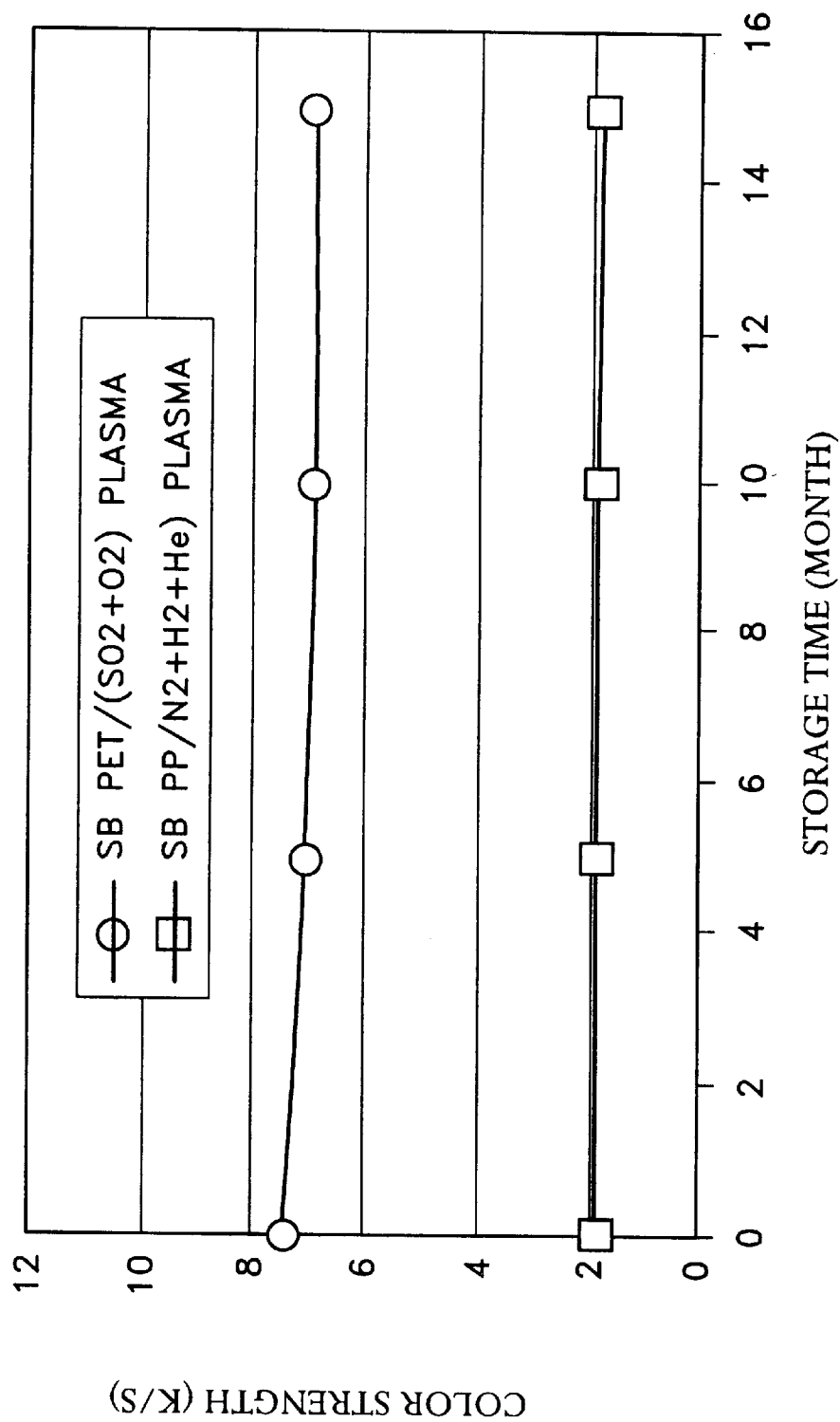
FIG. 14 shows the stability over time of PET and PP plasma-treated hydrophobic nonwoven polymer samples dyed with acid blue.

Another limitation of plasma-treated materials, according to the prior art, is a phenomenon known as aging. PP materials have been observed to lose desirable properties, such as increased surface energy, when exposed to air. Typically, significant property losses have been observed in the first few days after treatment. In contradistinction to the prior art, the inventors have found, as is shown in FIG. 14, that PET materials treated with an ($SO_2$+$O_2$) plasma, and PP materials treated with an ($N_2$+He+$H_2$) plasma, showed very little change in dyeability over 12 months. This result suggests that functional groups introduced on treated material surfaces are relatively stable.

FIG. 14 shows the stability over time of PET and PP plasma-treated hydrophobic nonwoven polymer samples dyed with acid blue. FIG. 14 indicates the hydrophobic polymer materials treated with a high-pressure glow discharge plasma demonstrated a dyeability of at least 85% after a period of about 12 months after plasma treatment, as compared to the dyeability of the treated material immediately following plasma treatment.

Unless explicitly stated otherwise, each numerical value and range recited in this specification should be interpreted as being approximate as if the word "about" or "approximately" preceded the value of the value or range.

While the invention has been particularly shown and described with reference to the preferred embodiments thereof, it will be understood by those skilled in the art that various changes in form and details may be made without departing from the spirit and scope of the invention. For example, the experiments described herein use nonwoven polymer webs for dyeing with water-based dyes, but the hydrophobic polymer materials could also be knitted or woven fabrics, films, or even individual fibers.

What is claimed is:

1. A method for increasing the dyeability of a polymer material, comprising the steps of:

(a) generating a glow discharge plasma; and (b) treating the polymer material with the glow discharge plasma in order to increase the dyeability of the polymer material, wherein:

the polymer material is a hydrophobic polymer material;

step (b) comprises the step of treating the polymer material with the glow discharge plasma in order to introduce hydrophilic functional groups onto a surface of the hydrophobic polymer material, thereby increasing the dyeability of the polymer material with a water-based dye;

the hydrophobic polymer material comprises at least one of polypropylene (PP), polyethylene (PE), polyethylene terephthalate (PET), polyester, polybutylene terephthalate (PBT), and polytrimethylene terephthalate (PTT); and the material is a multicomponent material comprising a bicomponent fiber having an inner core of one type of polymer and an outer sheath of another type of polymer.

2. The method of claim 1, wherein the plasma-treated polymer material comprises a hydrophobic inner core surrounded by an outer sheath having one or more hydrophilic functional groups.

3. The method of claim 1, wherein one or more of the functional groups has a cationic or an anionic polar charge.

4. The method of claim 1, wherein the glow discharge plasma has a pressure of about 50 Torr or greater.

5. The method of claim 4, wherein the glow discharge plasma has a pressure of about one atmosphere.

6. The method of claim 5, wherein the pressure of the glow discharge plasma is about 696 Torr.

7. The method of claim 1, further comprising the step of:
(c) exposing the plasma-treated polymer material to a dye to generate a dyed polymer material.

8. The method of claim 7, wherein the dye is a water-based dye.

9. The method of claim 1, wherein the glow discharge plasma is generated with a working gas comprising $SO_2$, $N_2$, $H_2$, $CO_2$, $CF_4$, NO, 2-Hydroxypropyl Methacrylate (HPMA), or combinations thereof or combinations thereof with at least one of $O_2$, He, $N_2O$, and air.

10. The method of claim 9, wherein the glow discharge plasma is generated with a working gas comprising one of ($SO_2+O_2$), ($N_2+H_2$), ($N_2+He+H_2$), ($CO_2+O_2+He$), ($CF_4+O_2+He$), ($N_2+NO+He$), ($CO_2+He$), ($CO_2+HPMA+N_2$), and ($HPMA+N_2$).

11. A The method of claim 1, wherein:
the polymer material comprises PP;
the glow discharge plasma is generated with a working gas comprising ($N_2+H_2$) having an $N_2$-to-$H_2$ flow rate ratio of between about 30 and 50, at a power of between about 350 watts and 450 watts, at a pressure of between about 25 inches Hg and 30 inches Hg, and at a temperature of between about 60° F. and 95° F.; and
the polymer material is treated with the glow discharge plasma for a time less than about 30 seconds.

12. The method of claim 11, further comprising the step of:
(c) exposing the plasma-treated polymer material to an acid dye applied at a temperature of between about 160° F. and 180° F. for a time of less than about 70 minutes to generate a dyed polymer material.

13. The method of claim 1, wherein:
the polymer material comprises PP;
the glow discharge plasma is generated with a working gas comprising ($N_2+He+H_2$) having an $N_2$-to-$H_2$ flow rate ratio of between about 2.5 and 50 and an $N_2$-to-He flow rate ratio of between about 4 and 6, at a power of between about 350 watts and 450 watts, at a pressure of between about 25 inches Hg and 30 inches Hg, and at a temperature of between about 60° F. and 95° F.; and
the polymer material is treated with the glow discharge plasma for a time of less than about 30 seconds.

14. The method of claim 13, further comprising the step of:
(c) exposing the plasma-treated polymer material to an acid dye applied at a temperature of between about 160° F. and 220° F. for a time of less than about 70 minutes to generateda dyed polymer material.

15. The method of claim 1, wherein:
the polymer material comprises PET;
the glow discharge plasma is generated with a working gas comprising ($SO_2+O_2$) having an $SO_2$-to-$O_2$ flow rate ratio of between about 25 and 30, at a power of between about 300 watts and 400 watts, at a pressure of between about 25 inches Hg and 30 inches Hg, and at a temperature of between about 85° F. and 110° F.; and
the polymer material is treated with the glow discharge plasma for a time of less than about 30 seconds.

16. The method of claim 15, further comprising the step of:
(c) exposing the plasma-treated polymer material to an acid dye applied at a temperature of between about 160° F. and 220° F. for a time of less than about 70 minutes to generate a dyed polymer material.

17. The method of claim 1, wherein:
the polymer material comprises PET;
the glow discharge plasma is generated with a working gas comprising ($N_2+He+H_2$) having an $N_2$-to-$H_2$ flow rate ratio of between about 30 and 50 and an $N_2$-to-He flow rate ratio of between about 6 and 8, at a power of between about 300 watts and 400 watts, at a pressure of between about 25 inches Hg and 30 inches Hg, and at a temperature of between about 75° F. and 95° F.; and
the polymer material is treated with the glow discharge plasma for a time of less than about 30 seconds.

18. The method of claim 17, further comprising the step of:
(c) exposing the plasma-treated polymer material to an acid dye or a basic dye applied at a temperature of between about 160° F. and 220° F. for a time of less than about 70 minutes to generate a dyed polymer material.

19. The method of claim 1, wherein the polymer material comprises polyester.

20. The method of claim 19, further comprising the step of:
(c) exposing the plasma-treated polymer material to an acid dye or a basic dye.

21. The method of claim 1, wherein the dyeability of the polymer material about 12 months after plasma treatment is at least about 85% of the dyeability of the polymer material immediately following the plasma treatment.

22. The method of claim 1, wherein the material is a fiber, a woven fabric, a nonwoven fabric, a knitted fabric, or a fiber web.

23. The method of claim 1, wherein:
the polymer material comprises PP; and
the glow discharge plasma is generated with a working gas comprising ($N_2+H_2$).

24. The method of claim 23, further comprising the step of:
(c) exposing the plasma-treated polymer material to an acid dye to generate a dyed polymer material.

25. The method of claim 1, wherein:
the polymer material comprises PP; and
the glow discharge plasma is generated with a working gas comprising ($N_2+He+H_2$).

26. The method of claim 25, further comprising the step of:
(c) exposing the plasma-treated polymer material to an acid dye to generate a dyed polymer material.

27. The method of claim 1, wherein:
the polymer material comprises PET; and
the glow discharge plasma is generated with a working gas comprising ($SO_2+O_2$).

28. The method of claim 27, further comprising the step of:
(c) exposing the plasma-treated polymer material to an acid dye to generate a dyed polymer material.

29. The method of claim 1, wherein:
the polymer material comprises PET; and
the glow discharge plasma is generated with a working gas comprising ($N_2+He+H_2$).

30. The method of claim 29, further comprising the step of:
(c) exposing the plasma-treated polymer material to an acid dye to generate a dyed polymer material.

31. The method of claim 29, further comprising the step of:
(c) exposing the plasma-treated polymer material to a basic dye to generate a dyed polymer material.

32. A plasma-treated polymer material generated by implementing a method comprising the steps of:
(a) generating a glow discharge plasma; and
(b) treating the polymer material with the glow discharge plasma in order to increase the dyeability of the polymer material, wherein:
the polymer material is a hydrophobic polymer material;
step (b) comprises the step of treating the polymer material with the glow discharge plasma in order to introduce hydrophilic functional groups onto a surface of the hydrophobic polymer material, thereby increasing the dyeability of the polymer material with a water-based dye;
the hydrophobic polymer material comprises at least one of polypropylene (PP), polyethylene (PE), polyethylene terephthalate (PET), polyester, polybutylene terephthalate (PBT), and polytrimethylene terephthalate (PIT); and
the material is a multicomponent material comprising a bicomponent fiber having an inner core of one type of polymer and an outer sheath of another type of polymer.

33. The material of claim 32, wherein one or more of the functional groups has a cationic or an anionic polar charge.

34. The material of claim 32, wherein the glow discharge plasma has a pressure of about 50 Torr or greater.

35. The material of claim 34, wherein the glow discharge plasma has a pressure of about one atmosphere.

36. The material of claim 32, further comprising the step of:
(c) exposing the plasma-treated polymer material to a dye to generate a dyed polymer material.

37. The material of claim 36, wherein the dye is a water-based dye.

38. The material of claim 32, wherein the glow discharge plasma is generated with a working gas comprising $SO_2$, $N_2$, $H_2$, $CO_2$, $CF_4$, NO, 2-Hydroxypropyl Methacrylate (HPMA), or combinations thereof or combinations thereof with at least one of $O_2$, He, $N_2O$, and air.

39. The material of claim 38, wherein the glow discharge plasma is generated with a working gas comprising one of ($SO_2+O_2$), ($N_2+H_2$), ($N_2+He+H_2$), ($CO_2+O_2+He$), ($CF_4+O_2+He$), ($N_2+NO+He$), ($CO_2+He$), ($CO_2+HPMA+N_2$), and ($HPMA+N_2$).

40. The material of claim 32, wherein:
the polymer material comprises PP;
the glow discharge plasma is generated with a working gas comprising ($N_2+H_2$) having an $N_2$-to-$H_2$ flow rate ratio of between about 30 and 50, at a power of between about 350 watts and 450 watts, at a pressure of between about 25 inches Hg and 30 inches Hg, and at a temperature of between about 60° F. and 95° F.; and
the polymer material is treated with the glow discharge plasma for a time less than about 30 seconds.

41. The material of claim 40, further comprising the step of:
(c) exposing the plasma-treated polymer material to an acid dye applied at a temperature of between about 160° F. and 180° F. for a time of less than about 70 minutes to generate a dyed polymer material.

42. The material of claim 32, wherein:
the polymer material comprises PP;
the glow discharge plasma is generated with a working gas comprising ($N_2+He+H_2$) having an $N_2$-to-$H_2$ flow rate ratio of between about 2.5 and 50 and an $N_2$-to-He flow rate ratio of between about 4 and 6, at a power of between about 350 watts and 450 watts, at a pressure of between about 25 inches Hg and 30 inches Hg, and at a temperature of between about 60° F. and 95° F.; and
the polymer material is treated with the glow discharge plasma for a time of less than about 30 seconds.

43. The material of claim 42, further comprising the step of:
(c) exposing the plasma-treated polymer material to an acid dye applied at a temperature of between about 160° F. and 220° F. for a time of less than about 70 minutes to generate a dyed polymer material.

44. The material of claim 32, wherein:
the polymer material comprises PET;
the glow discharge plasma is generated with a working gas comprising ($SO_2+O_2$) having an $SO_2$-to-$O_2$ flow rate ratio of between about 25 and 30, at a power of between about 300 watts and 400 watts, at a pressure of between about 25 inches Hg and 30 inches Hg, and at a temperature of between about 85° F. and 110° F.; and
the polymer material is treated with the glow discharge plasma for a time of less than about 30 seconds.

45. The material of claim 44, further comprising the step of:
(c) exposing the plasma-treated polymer material to an acid dye applied at a temperature of between about 160° F. and 220° F. for a time of less than about 70 minutes to generate a dyed polymer material.

46. The material of claim 32, wherein:
the polymer material comprises PET;
the glow discharge plasma is generated with a working gas comprising ($N_2+He+H_2$) having an $N_2$-to-$H_2$ flow rate ratio of between about 30 and 50 and an $N_2$-to-He flow rate ratio of between about 6 and 8, at a power of between about 300 watts and 400 watts, at a pressure of between about 25 inches Hg and 30 inches Hg, and at a temperature of between about 75° F. and 95° F.; and
the polymer material is treated with the glow discharge plasma for a time of less than about 30 seconds.

47. The material of claim 46, further comprising the step of:
(c) exposing the plasma-treated polymer material to an acid dye or a basic dye applied at a temperature of between about 160° F. and 220° F. for a time of less than about 70 minutes to generate a dyed polymer material.

48. The material of claim 32, wherein the polymer material comprises polyester.

49. The material of claim 48, further comprising the step of:
(c) exposing the plasma-treated polymer material to an acid dye or a basic dye.

50. The material of claim 32, wherein the dyeability of the polymer material about 12 months after plasma treatment is at least about 85% of the dyeability of the polymer material immediately following the plasma treatment.

51. The material of claim 32, wherein the material is a fiber, a woven fabric, a nonwoven fabric, a knitted fabric, or a fiber web.

52. The material of claim 32, wherein the plasma-treated polymer material comprises a hydrophobic inner core surrounded by an outer sheath having one or more hydrophilic functional groups.

53. The material of claim 32, wherein:
the polymer material comprises PP; and
the glow discharge plasma is generated with a working gas comprising ($N_2+H_2$).

54. The material of claim 53, further comprising the step of:
(c) exposing the plasma-treated polymer material to an acid dye to generate a dyed polymer material.

55. The material of claim 32, wherein:
the polymer material comprises PP; and
the glow discharge plasma is generated with a working gas comprising ($N_2+He+H_2$).

56. The material of claim 55, further comprising the step of:
(c) exposing the plasma-treated polymer material to an acid dye to generate a dyed polymer material.

57. The material of claim 32, wherein:
the polymer material comprises PET; and the glow discharge plasma is generated with a working gas comprising ($SO_2+O_2$).

58. The material of claim 57, further comprising the step of:
(c) exposing the plasma-treated polymer material to an acid dye to generate a dyed polymer material.

59. The material of claim 32, wherein:
the polymer material comprises PET; and
the glow discharge plasma is generated with a working gas comprising ($N_2+He+H_2$).

60. The material of claim 59, further comprising the step of:
(c) exposing the plasma-treated polymer material to an acid dye to generate a dyed polymer material.

61. The material of claim 59, further comprising the step of:
(c) exposing the plasma-treated polymer material to a basic dye to generate a dyed polymer material.

62. A method for increasing the dyeability of a polymer material, comprising the steps of:
(a) generating a glow discharge plasma; and
(b) treating the polymer material with the glow discharge plasma in order to increase the dyeability of the polymer material, wherein:
the polymer material comprises PP;
the glow discharge plasma is generated with a working gas comprising ($N_2+H_2$) having an $N_2$-to-$H_2$ flow rate ratio of between about 30 and 50, at a power of between about 350 watts and 450 watts, at a pressure of between about 25 inches Hg and 30 inches Hg, and at a temperature of between about 60° F. and 95° F.; and
the polymer material is treated with the glow discharge plasma for a time less than about 30 seconds.

63. The method of claim 62, further comprising the step of:
(c) exposing the plasma-treated polymer material to an acid dye applied at a temperature of between about 160° F. and 180° F. for a time of less than about 70 minutes to generate a dyed polymer material.

64. A method for increasing the dyeability of a polymer material, comprising the steps of:

(a) generating a glow discharge plasma; and
(b) treating the polymer material with the glow discharge plasma in order to increase the dyeability of the polymer material, wherein:
the polymer material comprises PP;
the glow discharge plasma is generated with a working gas comprising ($N_2+He+H_2$) having an $N_2$-to-$H_2$ flow rate ratio of between about 2.5 and 50 and an $N_2$-to-He flow rate ratio of between about 4 and 6, at a power of between about 350 watts and 450 watts, at a pressure of between about 25 inches Hg and 30 inches Hg, and at a temperature of between about 60° F. and 95° F.; and
the polymer material is treated with the glow discharge plasma for a time of less than about 30 seconds.

65. The method of claim 64, further comprising the step of:
(c) exposing the plasma-treated polymer material to an acid dye applied at a temperature of between about 160° F. and 220° F. for a time of less than about 70 minutes to generate a dyed polymer material.

66. A method for increasing the dyeability of a polymer material, comprising the steps of:
(a) generating a glow discharge plasma; and
(b) treating the polymer material with the glow discharge plasma in order to increase the dyeability of the polymer material, wherein:
the polymer material comprises PET; and
the glow discharge plasma is generated with a working gas comprising ($SO_2+O_2$).

67. The method of claim further comprising the step of:
(c) exposing the plasma-treated polymer material to an acid dye to generate a dyed polymer material.

68. The method of claim 66, wherein:
the glow discharge plasma is generated with the working gas comprising ($SO_2+O_2$) having an $SO_2$-to-$O_2$ flow rate ratio of between about 25 and 30, at a power of between about 300 watts and 400 watts, at a pressure of between about 25 inches Hg and 30 inches Hg, and at a temperature of between about 85° F. and 110° F.; and
the polymer material is treated with the glow discharge plasma for a time of less than about 30 seconds.

69. The method of claim 68, further comprising the step of:
(c) exposing the plasma-treated polymer material to an acid dye applied at a temperature of between about 160° F. and 220° F. for a time of less than about 70 minutes to generate a dyed polymer material.

70. A method for increasing the dyeability of a polymer material, comprising the steps of:
(a) generating a glow discharge plasma;
(b) treating the polymer material with the glow discharge plasma in order to increase the dyeability of the polymer material; and
(c) exposing the plasma-treated polymer material to an acid dye or a basic dye to generate a dyed polymer material, wherein:
the polymer material comprises PET; and
the glow discharge plasma is generated with a working gas comprising ($N_2+He+H_2$).

71. The method of claim 70, wherein step (c) comprises the step of exposing the plasma-treated polymer material to an acid dye to generate the dyed polymer material.

72. The method of claim 70, wherein step (c) comprises the step of exposing the plasma-treated polymer material to a basic dye to generate the dyed polymer material.

73. A method for increasing the dyeability of a polymer material, comprising the steps of:
(a) generating a glow discharge plasma; and
(b) treating the polymer material with the glow discharge plasma in order to increase the dyeability of the polymer material, wherein:
the polymer material comprises PET;
the glow discharge plasma is generated with a working gas comprising ($N_2$+He+$H_2$) having an $N_2$-to-$H_2$ flow rate ratio of between about 30 and 50 and an $N_2$-to-He flow rate ratio of between about 6 and 8, at a power of between about 300 watts and 400 watts, at a pressure of between about 25 inches Hg and 30 inches Hg, and at a temperature of between about 75° F. and 95° F.; and
the polymer material is treated with the glow discharge plasma for a time of less than about 30 seconds.

74. The method of claim 73, further comprising the step of:
(c) exposing the plasma-treated polymer material to an acid dye or a basic dye applied at a temperature of between about 160° F. and 220° F. for a time of less than about 70 minutes to generate a dyed polymer material.

75. A plasma-treated polymer material generated by implementing a method comprising the steps of:
(a) generating a glow discharge plasma; and
(b) treating the polymer material with the glow discharge plasma in order to increase the dyeability of the polymer material, wherein:
the polymer material comprises PP;
the glow discharge plasma is generated with a working gas comprising ($N_2$+$H_2$) having an $N_2$-to-$H_2$ flow rate ratio of between about 30 and 50, at a power of between about 350 watts and 450 watts, at a pressure of between about 25 inches Hg and 30 inches Hg, and at a temperature of between about 60° F. and 95° F.; and
the polymer material is treated with the glow discharge plasma for a time less than about 30 seconds.

76. The material of claim 75, further comprising the step of:
(c) exposing the plasma-treated polymer material to an acid dye applied at a temperature of between about 160° F. and 180° F. for a time of less than about 70 minutes to generate a dyed polymer material.

77. A plasma-treated polymer material generated by implementing a method comprising the steps of:
(a) generating a glow discharge plasma; and
(b) treating the polymer material with the glow discharge plasma in order to increase the dyeability of the polymer material, wherein:
the polymer material comprises PP;
the glow discharge plasma is generated with a working gas comprising ($N_2$+He+$H_2$) having an $N_2$-to-$H_2$ flow rate ratio of between about 2.5 and 50 and an $N_2$-to-He flow rate ratio of between about 4 and 6, at a power of between about 350 watts and 450 watts, at a pressure of between about 25 inches Hg and 30 inches Hg, and at a temperature of between about 60° F. and 95° F.; and
the polymer material is treated with the glow discharge plasma for a time of less than about 30 seconds.

78. The material of claim 77, further comprising the step of:
(c) exposing the plasma-treated polymer material to an acid dye applied at a temperature of between about 160° F. and 220° F. for a time of less than about 70 minutes to generate a dyed polymer material.

79. A plasma-treated polymer material generated by implementing a method comprising the steps of:
(a) generating a glow discharge plasma; and
(b) treating the polymer material with the glow discharge plasma in order to increase the dyeability of the polymer material, wherein:
the polymer material comprises PET; and
the glow discharge plasma is generated with a working gas comprising ($SO_2$+$O_2$).

80. The material of claim 79, further comprising the step of:
(c) exposing the plasma-treated polymer material to an acid dye to generate a dyed polymer material.

81. The material of claim 79, wherein:
the glow discharge plasma is generated with the working gas comprising ($SO_2$+$O_2$) having an $SO_2$-to-$O_2$ flow rate ratio of between about 25 and 30, at a power of between about 300 watts and 400 watts, at a pressure of between about 25 inches Hg and 30 inches Hg, and at a temperature of between about 85° F. and 110° F.; and
the polymer material is treated with the glow discharge plasma for a time of less than about 30 seconds.

82. The material of claim 81, further comprising the step of:
(c) exposing the plasma-treated polymer material to an acid dye applied at a temperature of between about 160° F. and 220° F. for a time of less than about 70 minutes to generate a dyed polymer material.

83. A plasma-treated polymer material generated by implementing a method comprising the steps of:
(a) generating a glow discharge plasma;
(b) treating the polymer material with the glow discharge plasma in order to increase the dyeability of the polymer material; and
(c) exposing the plasma-treated polymer material to an acid dye or a basic dye to generate a dyed polymer material, wherein:
the polymer material comprises PET; and
the glow discharge plasma is generated with a working gas comprising ($N_2$+He+$H_2$).

84. The material of claim 83, wherein step (c) comprises the step of exposing the plasma-treated polymer material to an acid dye to generate the dyed polymer material.

85. The material of claim 83, wherein step (c) comprises the step of exposing the plasma-treated polymer material to a basic dye to generate the dyed polymer material.

86. A plasma-treated polymer material generated by implementing a method comprising the steps of:
(a) generating a glow discharge plasma; and
(b) treating the polymer material with the glow discharge plasma in order to increase the dyeability of the polymer material, wherein:
the polymer material comprises PET;
the glow discharge plasma is generated with a working gas comprising ($N_2$+He+$H_2$) having an $N_2$-to-$H_2$ flow rate ratio of between about 30 and 50 and an $N_2$-to-He flow rate ratio of between about 6 and 8, at a power of between about 300 watts and 400 watts, at a pressure of between about 25 inches Hg and 30 inches Hg, and at a temperature of between about 75° F. and 95° F.; and
the polymer material is treated with the glow discharge plasma for a time of less than about 30 seconds.

87. The material of claim 86, further comprising the step of:
(c) exposing the plasma-treated polymer material to an acid dye or a basic dye applied at a temperature of between about 160° F. and 220° F. for a time of less than about 70 minutes to generate a dyed polymer material.

* * * * *

UNITED STATES PATENT AND TRADEMARK OFFICE
CERTIFICATE OF CORRECTION

PATENT NO.    : 6,479,595 B1
DATED         : November 12, 2002
INVENTOR(S)   : Dong Zhang et al.

It is certified that error appears in the above-identified patent and that said Letters Patent is hereby corrected as shown below:

Column 13,
Line 57, replace "to generateda dyed polymer material." with -- to generate a dyed polymer material. --.

Column 18,
Line 31, replace "The method of claim further comprising" with -- The method of claim 66, further comprising --.

Signed and Sealed this

Eighth Day of April, 2003

JAMES E. ROGAN
*Director of the United States Patent and Trademark Office*